(12) United States Patent
Kimball et al.

(10) Patent No.: US 12,200,023 B2
(45) Date of Patent: *Jan. 14, 2025

(54) ACCESSING CONTENT ITEMS FOR MEETINGS THROUGH A DESKTOP TRAY

(71) Applicant: Dropbox Inc., San Francisco, CA (US)

(72) Inventors: Andrea Kimball, Oakland, CA (US); Carola Pescio Canale, San Francisco, CA (US); Angela Gong, San Mateo, CA (US)

(73) Assignee: Dropbox Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/500,747

(22) Filed: Nov. 2, 2023

(65) Prior Publication Data
US 2024/0064182 A1    Feb. 22, 2024

Related U.S. Application Data

(63) Continuation of application No. 17/846,728, filed on Jun. 22, 2022, now Pat. No. 11,855,769, which is a continuation of application No. 16/505,120, filed on Jul. 8, 2019, now Pat. No. 11,381,613.

(51) Int. Cl.
| | |
|---|---|
| *H04L 65/401* | (2022.01) |
| *G06F 3/0482* | (2013.01) |
| *G06Q 10/1093* | (2023.01) |
| *H04L 12/18* | (2006.01) |

(52) U.S. Cl.
CPC ........ *H04L 65/4015* (2013.01); *G06F 3/0482* (2013.01); *G06Q 10/1095* (2013.01); *H04L 12/1813* (2013.01)

(58) Field of Classification Search
CPC ............ H04L 65/4015; H04L 12/1813; H04L 12/1827; H04L 51/08; H04L 65/403; G06F 3/0482; G06Q 10/1095
See application file for complete search history.

(56) References Cited

U.S. PATENT DOCUMENTS

| | | |
|---|---|---|
| 7,533,146 B1 | 5/2009 | Kumar |
| 9,237,305 B2 | 1/2016 | Guzman et al. |
| 9,525,709 B2 | 12/2016 | Cholkar et al. |

(Continued)

OTHER PUBLICATIONS

Final Office Action from U.S. Appl. No. 16/505,120, mailed Sep. 16, 2021, 29 pages.

(Continued)

*Primary Examiner* — Soe Hlaing
(74) *Attorney, Agent, or Firm* — Polsinelli PC

(57) ABSTRACT

Systems and methods for creating and accessing content items are provided. In some examples, a method can include receiving a user selection of an interface element located in a persistent user interface of an operating system desktop of a client device associated with a user account, identifying, based on a query to a meeting service, a meeting associated with the user account, displaying, in response to the user selection of the interface element, a set of user options for the meeting, the set of user options comprising an option to access a content item for the meeting, receiving a user selection of the option to access the content item for the meeting, and accessing, in response to the user selection, the content item.

20 Claims, 10 Drawing Sheets

(56) References Cited

U.S. PATENT DOCUMENTS

| | | |
|---|---|---|
| 9,648,279 B2 | 5/2017 | Shen et al. |
| 10,051,600 B1 | 8/2018 | Zhong et al. |
| 11,381,613 B2* | 7/2022 | Kimball .............. H04L 12/1813 |
| 2003/0076353 A1 | 4/2003 | Blackstock et al. |
| 2011/0264745 A1* | 10/2011 | Ferlitsch .............. G06Q 10/109 |
| | | 709/204 |
| 2016/0057388 A1 | 2/2016 | Rung et al. |
| 2017/0083871 A1* | 3/2017 | Chang .................... G06F 16/93 |
| 2018/0341374 A1 | 11/2018 | Faulkner et al. |

OTHER PUBLICATIONS

Non-Final Office Action from U.S. Appl. No. 16/505,120, mailed Dec. 21, 2021, 12 pages.
Non-Final Office Action from U.S. Appl. No. 16/505,120, mailed Mar. 12, 2021, 23 pages.
Non-Final Office Action from U.S. Appl. No. 17/846,728, mailed Apr. 27, 2023, 27 pages.
Notice of Allowance from U.S. Appl. No. 16/505,120, mailed Apr. 6, 2022, 7 pages.
Notice of Allowance from U.S. Appl. No. 17/846,728, mailed Sep. 8, 2023, 14 pages.

* cited by examiner

ACCESSING CONTENT ITEMS FOR MEETINGS THROUGH A DESKTOP TRAY

CROSS-REFERENCE TO RELATED APPLICATIONS

This application is a continuation of and claims the benefit of U.S. application Ser. No. 17/846,728, filed on Jun. 22, 2022, entitled ACCESSING CONTENT ITEMS FOR MEETINGS THROUGH A DESKTOP TRAY, which is a continuation of and claims the benefit of U.S. application Ser. No. 16/505,120, filed on Jul. 8, 2019, Issued U.S. Pat. No. 11,381,613, issued on Jul. 5, 2022, entitled ACCESSING CONTENT ITEMS FOR MEETINGS THROUGH A DESKTOP TRAY. All of which are expressly incorporated by reference herein in their entireties.

TECHNICAL FIELD

The present technology relates to user interfaces and the accessing of content items for meetings through a desktop tray.

BACKGROUND

Meetings with two or more participants are often scheduled by creating a meeting event on calendaring applications, video conferencing applications, online meeting applications, or collaboration applications. Each of these applications may have an interface (e.g., a web interface or a native application interface) configured to attach content items to a meeting event. This may involve a user locating the application (e.g., a web browser or native application) on a client device and opening that application on the client device. Often, this process may also involve navigating the operating system interface (e.g., nested folders in a file system, start menu interfaces, launch pad interfaces, finder interfaces, search interfaces, etc.) on the client device to find the application that the user wants to launch and having to wait for the application to load. After the application is launched, a user may further navigate the menus or other interface components of the application to select a particular meeting event, and navigate menus or other interface components of the application to the location where an existing content item may be selected and attached to the meeting event. If the content item does not already exist, the user must go through the multiple steps of create the content item using a different application (e.g., a word processing application) before the content item can be selected and attached to the meeting event. In some cases, the content items that can be attached to meeting events are content items supported by a content management system.

Content management systems allow users to store and access data on the cloud. A content management system can allow users to maintain a variety of content items stored on, and accessible from, the content management system. Some content management systems allow users to share data with other users and access the data in a collaborative fashion. Moreover, some content management systems may also support synchronization of copies of data across a number of client devices and servers so each copy of the data is identical and locally accessible from the client devices. The synchronization functionality can enable users to store local copies of the data on their client devices and access the local copies of the data from their client devices. The local copies of the data can be synchronized with the data on the content management systems to ensure consistency between local and cloud copies of the data. The local copies of the data may provide users with faster access to the data and may allow users to access the data when their client devices are offline.

To create a content item on a content management system, users may use a web interface or an application running on the client device that is associated with the content management system. For example, a user can locate a web browser application, launch and wait for the web browser to open, navigate to a website associated with the content management system, sign in to the website, locate an interface element on the website that creates the content item, and select the interface element. Using an application on the client device to create a cloud content item has some similarities to the typical content item creation process in that a user is still required to open the application and navigate to an interface element configured to create the cloud doc on the cloud service.

BRIEF DESCRIPTION OF THE DRAWINGS

The above-recited and other advantages and features of the present technology will become apparent by reference to specific implementations illustrated in the appended drawings. A person of ordinary skill in the art will understand that these drawings only show some examples of the present technology and would not limit the scope of the present technology to these examples. Furthermore, the skilled artisan will appreciate the principles of the present technology as described and explained with additional specificity and detail through the use of the accompanying drawings in which.

DETAILED DESCRIPTION

Figure 1A:
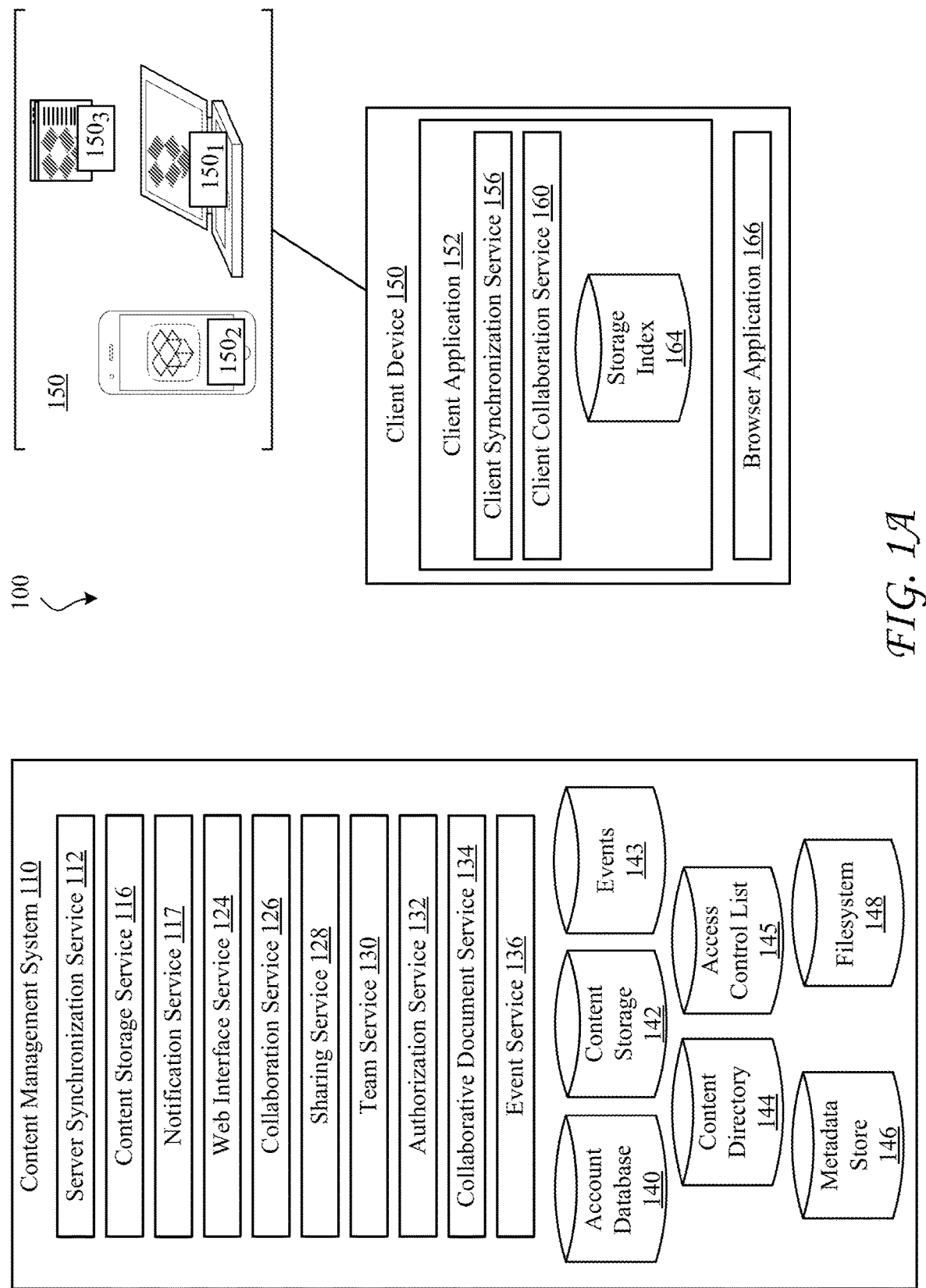
FIG. 1A shows an example configuration of a computing environment including a content management system and client devices, in accordance with various embodiments of the subject technology.

Various examples of the present technology are discussed in detail below. While specific implementations are discussed, it should be understood that this is done for illustration purposes only. A person skilled in the relevant art will recognize that other components and configurations may be used without parting from the spirit and scope of the present technology.

As noted above, although there are ways of attaching content items to a meeting event, doing so involves a number of steps that include, for example, searching for and navigating through the right interface elements and waiting for various applications (e.g., a web browser or native application running on a client device) to open. The path(s) a user traces during this process may also take the user across large swaths of a display interface which, with large modern displays, may be suboptimal and inconvenient. Similarly, accessing content items that have been attached to a meeting event also involves a number of steps and searching for the correct interfaces.

Aspects of the subject technology provide an improved user interface and user experience by allowing a user to access content items associated with a meeting event from a persistent user interface located on an operating system desktop of a client device. The persistent user interface may be, for example, a system tray for a version of the Microsoft Windows operating system or a menu bar for a version of the Macintosh operating system (e.g., macOS). The persistent user interface may include an interface element (e.g., an icon) that, when selected by a user, provides the user with options to access content items already associated with a meeting event or to associate the content items with a meeting event.

The options may be provided in a meeting card interface (e.g., a window) that provides a status indicator for a meeting event. The options in the meeting card interface may include, for example, an option to create a content item to attach to a meeting event, find and select an existing content item to attach to the meeting event, view content items that are attached to a meeting event, join a meeting event, or share a content item with other attendees of a meeting event. Some aspects of the subject technology also provide suggested content items to attach to a meeting event.

By providing the meeting card interface via a persistent user interface on the operating system desktop, a user is able to view, access, and create content items related to a meeting event with fewer steps, less time (e.g., time locating the correct interface elements, time waiting for an application to load, etc.), and/or less distance traversed across the desktop interface.

Furthermore, as is discussed in further detail throughout, there is increasing use of various local and cloud-based content items and applications from different content management systems. Various different meeting applications and/or services are also used. Various aspects of the subject technology provide an integrated and unified solution that addresses or overcomes various technical problems and limitations associated with the use of different applications and services for content items and/or meeting orchestration.

For example, the meeting card interface may provide options to create, access, or attach different types of content items to a meeting event. These different types of content items may be associated with different applications and/or cloud services (e.g., cloud storage systems or other content management systems). As a result, a user may be able to go to the same meeting card interface at a familiar location to access all content items associated with meeting events instead of having the search, navigate, open, wait, and locate interface elements in multiple different applications or websites.

Various aspects of the disclosed technologies are deployed in the context of one or more content management systems, such as a cloud storage service, having content item synchronization capabilities and collaboration features, among others. An example configuration 100 of a content management system and environment is shown in FIG. 1A, which depicts content management system 110 interacting with client device 150.

Accounts

Content management system 110 can store content items in association with accounts, as well as perform a variety of content item management tasks, such as retrieve, modify, browse, and/or share the content item(s). Furthermore, content management system 110 can enable an account to access content item(s) from multiple client devices.

Content management system 110 supports a plurality of accounts. An entity (user, group of users, team, company, etc.) can create an account with content management system, and account details can be stored in account database 140. Account database 140 can store profile information for registered entities. In some cases, profile information for registered entities includes a username and/or email address. Account database 140 can include account management information, such as account type (e.g. various tiers of free or paid accounts), storage space allocated, storage space used, client devices 150 having a registered content management client application 152 resident thereon, security settings, personal configuration settings, etc.

Account database 140 can store groups of accounts associated with an entity. Groups can have permissions based on group policies and/or access control lists, and members of the groups can inherit the permissions. For example, a marketing group can have access to one set of content items while an engineering group can have access to another set of content items. An administrator group can modify groups, modify user accounts, etc.

Content Item Storage

A feature of content management system 110 is the storage of content items, which can be stored in content storage 142. Content items can be any digital data such as documents, collaboration content items, text files, audio files, image files, video files, webpages, executable files, binary files, etc. A content item can also include collections or other mechanisms for grouping content items together with different behaviors, such as folders, zip files, playlists, albums, etc. A collection can refer to a folder, or a plurality of content items that are related or grouped by a common attribute. In some embodiments, content storage 142 is combined with other types of storage or databases to handle specific functions. Content storage 142 can store content items, while metadata regarding the content items or objects associated with the content items or user accounts can be stored in metadata store 146. Likewise, data regarding where a content item is stored in content storage 142 can be stored in content directory 144. Additionally, data regarding changes, access, etc., can be stored in filesystem 148.

Each of the various storages/databases such as content storage 142, content directory 144, filesystem 148, and metadata store 146 can be comprised of more than one such storage or database and can be distributed over many devices and locations. Other configurations are also possible. For example, data from content storage 142, content directory 144, filesystem 148, and/or metadata store 146 may be combined into one or more content storages or databases or further segmented into additional content storages or databases. Thus, content management system 110 may include more or less storages and/or databases than shown in FIG. 1A.

In some embodiments, content storage 142 is associated with at least one content storage service 116, which includes software or other processor executable instructions for managing the storage of content items including, but not limited to, receiving content items for storage, preparing content items for storage, selecting a storage location for the content item, retrieving content items from storage, etc. In some embodiments, content storage service 116 can divide a content item into smaller chunks for storage at content storage 142. The location of each chunk making up a content item can be recorded in content directory 144. Content directory 144 can include a content entry for each content item stored in content storage 142. The content entry can be associated with a unique ID, which identifies a content item.

In some embodiments, the unique ID, which identifies a content item in content directory 144, can be derived from a deterministic hash function. This method of deriving a unique ID for a content item can ensure that content item duplicates are recognized as such since the deterministic hash function will output the same identifier for every copy of the same content item, but will output a different identifier for a different content item. Using this methodology, content storage service 116 can output a unique ID for each content item.

Content storage service 116 can also designate or record a content path for a content item in metadata store 146. The content path can include the name of the content item and/or folder hierarchy associated with the content item. For example, the content path can include a folder or path of folders in which the content item is stored in a local file system on a client device. While content items are stored in content storage 142 in blocks and may not be stored under a tree like directory structure, such directory structure is a comfortable navigation structure for users. Content storage service 116 can define or record a content path for a content item wherein the "root" node of a directory structure can be a namespace for each account. Within the namespace can be a directory structure defined by a user of an account and/or content storage service 116. Metadata store 146 can store the content path for each content item as part of a content entry.

In some embodiments the namespace can include additional namespaces nested in the directory structure as if they are stored within the root node. This can occur when an account has access to a shared collection. Shared collections can be assigned their own namespace within content management system 110. While some shared collections are actually a root node for the shared collection, they are located subordinate to the account namespace in the directory structure, and can appear as a folder within a folder for the account. As addressed above, the directory structure is merely a comfortable navigation structure for users, but does not correlate to storage locations of content items in content storage 142.

While the directory structure in which an account views content items does not correlate to storage locations at content management system 110, the directory structure can correlate to storage locations on client device 150 depending on the file system used by client device 150.

As addressed above, a content entry in content directory 144 can also include the location of each chunk making up a content item. More specifically, the content entry can include content pointers that identify the location in content storage 142 of the chunks that make up the content item.

In addition to a content path and content pointer, a content entry in content directory 144 can also include a user account identifier that identifies the user account that has access to the content item and/or a group identifier that identifies a group with access to the content item and/or a namespace to which the content entry belongs.

Content storage service 116 can decrease the amount of storage space required by identifying duplicate content items or duplicate blocks that make up a content item or versions of a content item. Instead of storing multiple copies, content storage 142 can store a single copy of the content item or block of the content item and content directory 144 can include a pointer or other mechanism to link the duplicates to the single copy.

Content storage service 116 can also store metadata describing content items, content item types, folders, file path, and/or the relationship of content items to various accounts, collections, or groups in metadata store 146, in association with the unique ID of the content item.

Content storage service 116 can also store a log of data regarding changes, access, etc., in filesystem 148. Filesystem 148 can include the unique ID of the content item and a description of the change or access action along with a time stamp or version number and any other relevant data. Filesystem 148 can also include pointers to blocks affected by the change or content item access. Content storage service can provide the ability to undo operations, by using a content item version control that tracks changes to content items, different versions of content items (including diverging version trees), and a change history that can be acquired from the filesystem 148.

Content Item Synchronization

Another feature of content management system 110 is synchronization of content items with at least one client device 150. Client device(s) can take different forms and have different capabilities. For example, client device 150₁ is a computing device having a local file system accessible by multiple applications resident thereon. Client device 150₂ is a computing device wherein content items are only accessible to a specific application or by permission given by the specific application, and the content items are typically stored either in an application specific space or in the cloud. Client device 150₃ is any client device accessing content management system 110 via a web browser and accessing content items via a web interface. While example client devices 150₁, 150₂, and 150₃ are depicted in form factors such as a laptop, mobile device, or web browser, it should be understood that the descriptions thereof are not limited to devices of these example form factors. For example a mobile device such as client 150₂ might have a local file system accessible by multiple applications resident thereon, or client 150₂ might access content management system 110 via a web browser. As such, the form factor should not be considered limiting when considering client 150's capabilities. One or more functions described herein with respect to client device 150 may or may not be available on every client device depending on the specific capabilities of the device—the file access model being one such capability.

In many embodiments, client devices are associated with an account of content management system 110, but in some embodiments client devices can access content using shared links and do not require an account.

As noted above, some client devices can access content management system 110 using a browser application 166, such as a web browser. For example, client device 150 can use browser application 166 to access web pages and content on content management system 110. However, client devices can also access content management system 110 using client application 152 stored and running on client device 150. Client application 152 can include a client synchronization service 156. Client synchronization service 156 can be in communication with server synchronization service 112 to synchronize changes to content items between client device 150 and content management system 110.

Client device 150 can synchronize content with content management system 110 via client synchronization service 156. The synchronization can be platform agnostic. That is, content can be synchronized across multiple client devices of varying type, capabilities, operating systems, etc. Client synchronization service 156 can synchronize any changes (new, deleted, modified, copied, or moved content items) to content items in a designated location of a file system of client device 150.

Content items can be synchronized from client device 150 to content management system 110, and vice versa. In embodiments wherein synchronization is from client device 150 to content management system 110, a user can manipulate content items directly from the file system of client device 150, while client synchronization service 156 can monitor directory on client device 150 for changes to files within the monitored folders.

When client synchronization service 156 detects a write, move, copy, or delete of content in a directory that it monitors, client synchronization service 156 can synchronize the changes to content management system service 116. In some embodiments, client synchronization service 156 can perform some functions of content management system service 116 including functions addressed above such as dividing the content item into blocks, hashing the content item to generate a unique identifier, etc. Client synchronization service 156 can index content within client storage index 164 and save the result in storage index 164. Indexing can include storing paths plus a unique server identifier, and a unique client identifier for each content item. In some embodiments, client synchronization service 156 learns the unique server identifier from server synchronization service 112, and learns the unique client identifier from the operating system of client device 150.

Client synchronization service 156 can use storage index 164 to facilitate the synchronization of at least a portion of the content within client storage with content associated with a user account on content management system 110. For example, client synchronization service 156 can compare storage index 164 with content management system 110 and detect differences between content on client storage and content associated with a user account on content management system 110. Client synchronization service 156 can then attempt to reconcile differences by uploading, downloading, modifying, and deleting content on client storage as appropriate. Content storage service 116 can store the changed or new block for the content item and update filesystem 148, metadata store 146, content directory 144, content storage 142, account database 140, etc. as appropriate.

When synchronizing from content management system 110 to client device 150, a mount, modification, addition, deletion, move of a content item recorded in filesystem 148 can trigger a notification to be sent to client device 150 using notification service 117. When client device 150 is informed of the change a request changes listed in filesystem 148 since the last synchronization point known to the client device. When client device 150 determines that it is out of synchronization with content management system 110, client synchronization service 156 requests content item blocks including the changes, and updates its local copy of the changed content items.

In some embodiments, storage index 164 stores tree data structures wherein one tree reflects the latest representation of a directory according to server synchronization service 112, while another tree reflects the latest representation of the directory according to client synchronization service 156. Client synchronization service can work to ensure that the tree structures match by requesting data from server synchronization service 112 or committing changes on client device 150 to content management system 110.

Sometimes client device 150 might not have a network connection available. In this scenario, client synchronization service 156 can monitor the linked collection for content item changes and queue those changes for later synchronization to content management system 110 when a network connection is available. Similarly, a user can manually start, stop, pause, or resume synchronization with content management system 110.

Client synchronization service 156 can synchronize all content associated with a particular user account on content management system 110. Alternatively, client synchronization service 156 can selectively synchronize a portion of the content of the total content associated with the particular user account on content management system 110. Selectively synchronizing only a portion of the content can preserve space on client device 150 and save bandwidth.

In some embodiments, client synchronization service 156 selectively stores a portion of the content associated with the particular user account and stores placeholder content items in client storage for the remainder portion of the content. For example, client synchronization service 156 can store a placeholder content item that has the same filename, path, extension, metadata, of its respective complete content item on content management system 110, but lacking the data of the complete content item. The placeholder content item can be a few bytes or less in size while the respective complete content item might be significantly larger. After client device 150 attempts to access the content item, client synchronization service 156 can retrieve the data of the content item from content management system 110 and provide the complete content item to accessing client device 150. This approach can provide significant space and bandwidth savings while still providing full access to a user's content on content management system 110.

Collaboration Features

Another feature of content management system 110 is to facilitate collaboration between users. Collaboration features include content item sharing, commenting on content items, co-working on content items, instant messaging, providing presence and seen state information regarding content items, etc.

Sharing

Content management system 110 can manage sharing content via sharing service 128. Sharing content by providing a link to the content can include making the content item accessible from any computing device in network communication with content management system 110. However, in some embodiments a link can be associated with access restrictions enforced by content management system 110 and access control list 145. Sharing content can also include linking content using sharing service 128 to share content within content management system 110 with at least one additional user account (in addition to the original user account associated with the content item) so that each user account has access to the content item. The additional user account can gain access to the content by accepting the content, which will then be accessible through either web interface service 124 or directly from within the directory structure associated with their account on client device 150. The sharing can be performed in a platform agnostic manner. That is, the content can be shared across multiple client devices 150 of varying type, capabilities, operating systems, etc. The content can also be shared across varying types of user accounts.

To share a content item within content management system 110 sharing service 128 can add a user account identifier or multiple user account identifiers to a content entry in access control list database 145 associated with the content item, thus granting the added user account access to the content item. Sharing service 128 can also remove user account identifiers from a content entry to restrict a user account's access to the content item. Sharing service 128 can record content item identifiers, user account identifiers given access to a content item, and access levels in access control list database 145. For example, in some embodiments, user account identifiers associated with a single content entry can specify different permissions for respective user account identifiers with respect to the associated content item.

To share content items outside of content management system 110, sharing service 128 can generate a custom network address, such as a uniform resource locator (URL), which allows any web browser to access the content item or collection in content management system 110 without any authentication. To accomplish this, sharing service 128 can include content identification data in the generated URL, which can later be used to properly identify and return the requested content item. For example, sharing service 128 can include the account identifier and the content path or a content item identifying code in the generated URL. Upon selection of the URL, the content identification data included in the URL can be transmitted to content management system 110, which can use the received content identification data to identify the appropriate content item and return the content item.

In addition to generating the URL, sharing service 128 can also be configured to record in access control list database 145 that a URL to the content item has been created. In some embodiments, the content entry associated with a content item can include a URL flag indicating whether a URL to the content item has been created. For example, the URL flag can be a Boolean value initially set to 0 or false to indicate that a URL to the content item has not been created. Sharing service 128 can change the value of the flag to 1 or true after generating a URL to the content item.

In some embodiments, sharing service 128 can associate a set of permissions to a URL for a content item. For example, if a user attempts to access the content item via the URL, sharing service 128 can provide a limited set of permissions for the content item. Examples of limited permissions include restrictions that the user cannot download the content item, save the content item, copy the content item, modify the content item, etc. In some embodiments, limited permissions include restrictions that only permit a content item to be accessed from with a specified domain, i.e., from within a corporate network domain, or by accounts associated with a specified domain, e.g., accounts associated with a company account (e.g., @acme.com).

In some embodiments, sharing service 128 can also be configured to deactivate a generated URL. For example, each content entry can also include a URL active flag indicating whether the content should be returned in response to a request from the generated URL. For example, sharing service 128 can only return a content item requested by a generated link if the URL active flag is set to 1 or true. Thus, access to a content item for which a URL has been generated can be easily restricted by changing the value of the URL active flag. This allows a user to restrict access to the shared content item without having to move the content item or delete the generated URL. Likewise, sharing service 128 can reactivate the URL by again changing the value of the URL active flag to 1 or true. A user can thus easily restore access to the content item without the need to generate a new URL.

In some embodiments, content management system 110 can designate a URL for uploading a content item. For example, a first user with a user account can request such a URL, provide the URL to a contributing user and the contributing user can upload a content item to the first user's user account using the URL.

Events

Content management system 110 can track, create, and store events involving content items and/or user activity. For example, when a user interacts with a content item (e.g., add, edit, post, share, delete, comment, move, rename, etc.) and/or interacts with another user (e.g., message, comment, collaborate, etc.), event service 136 can generate an event for such interaction. When event service 136 detects a user interaction with a content item and/or another user, event service 136 can create an event identifier (e.g., unique event identifier) and event type, and associate the event identifier and event type with the user (e.g., user identifier and namespace identifier) to create an event or event record for the interaction. After the event is created, event service 136 can send the event identifier and any information associated with the event to events store 143 for storage.

Events store 143 can include one or more storage systems, such as one or more databases, for storing events and associated information. In some examples, events store 143 can include a distributed database or distributed storage system. Events store 143 can receive and store the event data for access by content management system 110.

Team Service

In some embodiments content management system 110 includes team service 130. Team service 130 can provide functionality for creating and managing defined teams of user accounts. Teams can be created for a company, with sub-teams (e.g., business units, or project teams, etc.), and user accounts assigned to teams and sub-teams, or teams can be created for any defined group of user accounts. Teams service 130 can provide a common shared space for the team, private user account folders, and access limited shared folders. Teams service can also provide a management interface for an administrator to manage collections and content items within team, and can manage user accounts that are associated with the team.

Authorization Service

In some embodiments, content management system 110 includes authorization service 132. Authorization service 132 ensures that a user account attempting to access a namespace has appropriate rights to access the namespace. Authorization service 132 can receive a token from client application 152 that follows a request to access a namespace and can return the capabilities permitted to the user account. For user accounts with multiple levels of access (e.g. a user account with user rights and administrator rights) authorization service 132 can also require explicit privilege escalation to avoid unintentional actions by administrators.

Presence and Seen State

In some embodiments, content management system can provide information about how users with which a content item is shared are interacting or have interacted with the content item. In some embodiments, content management system 110 can report that a user with which a content item is shared is currently viewing the content item. For example, client collaboration service 160 can notify notifications service 117 when client device 150 is accessing the content item. Notifications service 117 can then notify all client devices of other users having access to the same content item of the presence of the user of client device 150 with respect to the content item. Content management system 110 (e.g., via event service 136) and/or client device 150 can track user interactions with content, such as read or write events, and maintain a history of such events and interactions for a user (e.g., events store 143).

In some embodiments, content management system 110 can report a history of user interaction with a shared content item. Collaboration service 126 can query data sources such as events store 143, metadata store 146 and filesystem 148 to determine that a user has saved the content item, that a user has yet to view the content item, etc., and disseminate this status information using notification service 117 to other users so that they can know who currently is or has viewed or modified the content item.

Collaboration service 126 can facilitate comments associated with content, even if a content item does not natively support commenting functionality. Such comments can be stored in metadata store 146.

Collaboration service 126 can originate and transmit notifications for users. For example, a user can mention another user in a comment and collaboration service 126 can send a notification to that user that he has been mentioned in the comment. Various other content item events can trigger notifications, including deleting a content item, sharing a content item, etc.

Collaboration service 126 can provide a messaging platform whereby users can send and receive instant messages, voice calls, emails, etc.

Collaboration Content Items

In some embodiments content management service can also include Collaborative document service 134 which can provide an interactive content item collaboration platform whereby users can simultaneously create collaboration content items, comment in the collaboration content items, and manage tasks within the collaboration content items. Collaboration content items can be files that users can create and edit using a collaboration content item editor, and can contain collaboration content item elements. Collaboration content item elements may include a collaboration content item identifier, one or more author identifiers, collaboration content item text, collaboration content item attributes, interaction information, comments, sharing users, etc. Collaboration content item elements can be stored as database entities, which allows for searching and retrieving the collaboration content items. Multiple users may access, view, edit, and collaborate on collaboration content items at the same time or at different times. In some embodiments this can be managed by requiring two users access a content item through a web interface and there they can work on the same copy of the content item at the same time.

Collaboration Companion Interface

In some embodiments client collaboration service 160 can provide a native application companion interface for the purpose of displaying information relevant to a content item being presented on client device 150. In embodiments wherein a content item is accessed by a native application stored and executed on client device 150, where the content item is in a designated location of the file system of client device 150 such that the content item is managed by content application 152, the native application may not provide any native way to display the above addressed collaboration data. In such embodiments, client collaboration service 160 can detect that a user has opened a content item, and can provide an overlay with additional information for the content item, such as collaboration data. For example, the additional information can include comments for the content item, status of the content item, activity of other users previously or currently viewing the content item. Such an overlay can warn a user that changes might be lost because another user is currently editing the content item.

In some embodiments, one or more of the services or storages/databases discussed above can be accessed using public or private application programming interfaces.

Certain software applications can access content storage 142 via an API on behalf of a user. For example, a software package such as an application running on client device 150, can programmatically make API calls directly to content management system 110 when a user provides authentication credentials, to read, write, create, delete, share, or otherwise manipulate content.

A user can view or manipulate content stored in a user account via a web interface generated and served by web interface service 124. For example, the user can navigate in a web browser to a web address provided by content management system 110. Changes or updates to content in the content storage 142 made through the web interface, such as uploading a new version of a content item, can be propagated back to other client devices associated with the user's account. For example, multiple client devices, each with their own client software, can be associated with a single account and content items in the account can be synchronized between each of the multiple client devices.

Client device 150 can connect to content management system 110 on behalf of a user. A user can directly interact with client device 150, for example when client device 150 is a desktop or laptop computer, phone, television, internet-of-things device, etc. Alternatively or additionally, client device 150 can act on behalf of the user without the user having physical access to client device 150, for example when client device 150 is a server.

Some features of client device 150 are enabled by an application installed on client device 150. In some embodiments, the application can include a content management system specific component. For example, the content management system specific component can be a stand-alone application 152, one or more application plug-ins, and/or a browser extension. However, the user can also interact with content management system 110 via a third-party application, such as a web browser, that resides on client device 150 and is configured to communicate with content management system 110. In various implementations, the client-side application 152 can present a user interface (UI) for a user to interact with content management system 110. For example, the user can interact with the content management system 110 via a file system explorer integrated with the file system or via a webpage displayed using a web browser application. Although some embodiments are discussed in relation to a web browser application, other types of server based applications configured to access content items stored on the content management system 110 may similarly be used.

In some embodiments, client application 152 can be configured to manage and synchronize content for more than one account of content management system 110. In such embodiments client application 152 can remain logged into multiple accounts and provide normal services for the multiple accounts. In some embodiments, each account can appear as folder in a file system, and all content items within that folder can be synchronized with content management system 110. In some embodiments, client application 152 can include a selector to choose one of the multiple accounts to be the primary account or default account.

While content management system 110 is presented with specific components, it should be understood by one skilled in the art, that the architectural configuration of system 100 is simply one possible configuration and that other configurations with more or fewer components are possible. Further, a service can have more or less functionality, even including functionality described as being with another service. Moreover, features described herein with respect to an embodiment can be combined with features described with respect to another embodiment.

While configuration 100 is presented with specific components, it should be understood by one skilled in the art, that the architectural configuration of system 100 is simply one possible configuration and that other configurations with more or fewer components are possible.

Figure 1B:
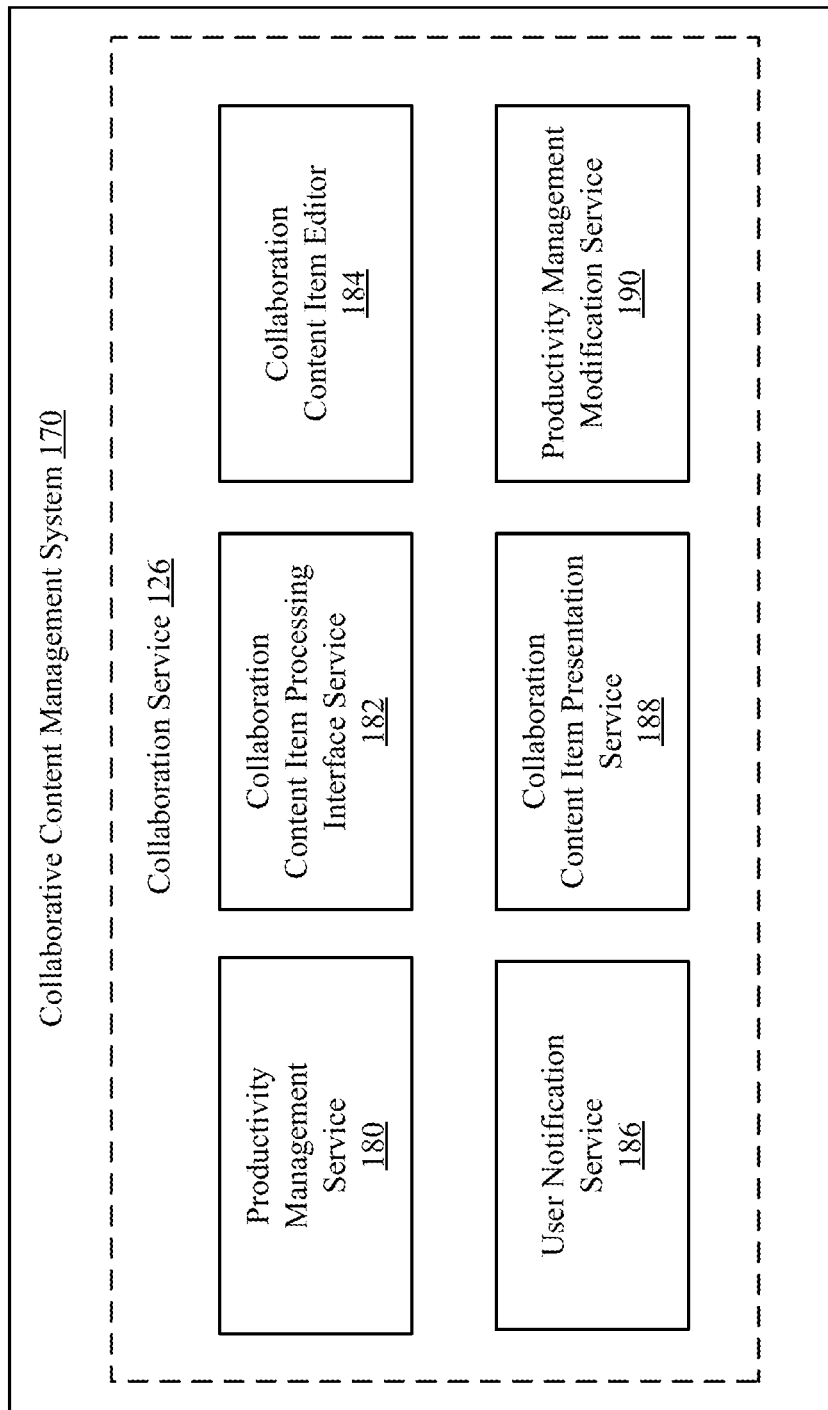
FIG. 1B shows an example collaboration content management system, in accordance with various embodiments of the subject technology.

FIG. 1B shows an example collaboration content management system 170, according to some examples. Collaboration content management system 170 can include one or more servers and/or applications for hosting and running collaboration service 126. Collaboration content management system 170 can be part of content management system 110 or separate from content management system 110. For clarity and explanation purposes, collaboration content management system 170 will be described herein as part of content management system 110.

Collaboration service 126 can include one or more components and/or services. For example, collaboration service 126 may include productivity management service 180, collaboration content item processing interface service 182, collaboration content item editor 184, user notification service 186, collaboration content item presentation service 188, and productivity management modification service 190. Productivity management service 180, collaboration content item processing interface service 182, collaboration content item editor 184, user notification service 186, collaboration content item presentation service 188, and/or productivity management modification service 190 can include one or more services, components, devices, etc., such as physical servers, virtual machines, software containers, etc. Moreover, one or more of productivity management service 180, collaboration content item processing interface service 182, collaboration content item editor 184, user notification service 186, collaboration content item presentation service 188, and productivity management modification service 190 may be coupled to one another or to components not explicitly shown.

Productivity management service 180 may be configured to gather productivity data from content management system 110. In various embodiments, productivity management service 180 identifies an event and gathers information related to the event. For instance, productivity management service 180 may gather a specific calendar entry and/or a specific task from an online calendar. Productivity management service 180 may further gather information from the calendar entry or gather information related to the calendar entry such as time(s), date(s), relevant locations, title(s), agenda(s), summaries, description(s), and/or attendees related to the event. Productivity management service 180 may provide the productivity data to the other modules of collaboration service 126.

Collaboration content item processing interface service 182 may be configured to interface with collaboration service 126. In various embodiments, collaboration content item processing interface service 182 may provide collaboration content items to one or more modules of collaboration service 126, as described further herein.

Collaboration content item editor 184 may be configured to create and/or modify collaboration content items. A collaboration content item may be created in a variety of ways. In some embodiments, collaboration content item editor 184 enables creation of the collaboration content item into the content management system 106. Collaboration content item editor 184 may enable access to or be any collaboration content item editing application (e.g., Microsoft Word®, Google Docs®, or the like) either in the cloud or executed locally. In one example, content management system 106 may provide to one of client devices 150 a user interface element (e.g., a box or a button) that allows creation of a new collaboration content item.

In some embodiments, collaboration content item editor 184 may create the collaboration content item in conjunction with the productivity management service 180. For example, collaboration content item editor 184 may provide a suggestion to a user to create or invoke a collaboration content item associated with an upcoming event. In various embodiments, collaboration service 126 may identify a user that is opening or otherwise using collaboration content item editor 184. Productivity management service 180 may identify an upcoming event for the user on the user's calendar. Subsequently, collaboration content item editor 184 may provide a suggestion to the user to create or invoke the collaboration content item associated with the upcoming event.

Although it is discussed that collaboration content item editor 184 may provide a suggestion to the user to create or invoke the collaboration content item associated with the upcoming event, it will be appreciated that the suggestion to create or invoke the collaboration content item may be made by any application. For example, a user may log into and/or otherwise access any application or suite of applications. Once the user is identified and an upcoming event is identified on the user's calendar, any application may provide the user with the suggestion to create or invoke the collaboration content item associated with the upcoming event. The suggestion may be provided to the user in any number of ways. In one example, an application suite management system (e.g., managing a variety of different applications) may provide the suggestion in a notification section of a window. In another example, a workspace may include the suggestion to the user in a section dedicated to notifications. In a further example, an email program may generate an email containing the suggestion to the user.

If the user requests creation or invocation of the collaboration content item in response to the suggestion, collaboration content item editor 184 may create or invoke the requested collaboration content item. If the application that provided the suggestion to the user is not a collaboration content item editor, then a collaboration content item editor may be executed and the requested collaboration content item created and/or invoked in response to the user's request.

In accordance with some embodiments, collaboration content item editor 184 may configure the productivity management service 180 to provide access to the collaboration content item (e.g., using a link, including the collaboration content item, or any other mechanism to enable access to the collaboration content item) in a meeting request, a task entry, or the like. In some embodiments, collaboration content item editor 184 may instruct productivity management service 180 to place an icon corresponding to a link to the collaboration content item in the calendar entry, meeting request, task entry, or the like. When a user has opened the link (e.g., by clicking the icon), the user may be directly guided to the collaboration content item from the meeting request, task entry, or the like. In one example, the link in the calendar entry may provide the user (e.g., using client device 150) access to a collaboration content item stored in content management system 106 (e.g., in storage accessible through the cloud) or in productivity management service 180.

Once the user requests to create or invoke the collaboration content item, collaboration content item editor 184 may create and/or invoke a collaboration content item. The collaboration content item may be subsequently edited, altered, viewed, changed, stored, and/or the like by an editing application (e.g., either stored locally on a client device or in the cloud). In various embodiments, one or more different client devices 150 may utilize different editing applications to make changes to the collaboration content item. Collaboration content item editor 184 and/or other editing applications may allow for the collaboration content item to be changed by multiple different users using different client devices 150 at the same time or substantially at the same time (e.g., in real time or substantially in real time).

It will be appreciated that users may be automatically guided to a collaboration content item related to a calendar entry, meeting request, a task entry, or the like without human intervention. In some embodiments, users may be guided to a collaboration content item related to a calendar entry, a meeting request, a task entry, or the like without having the users separately open collaboration content item editing applications. Such functionalities may prove particularly convenient for users seeking to take, review, or collaborate on notes associated with an event, as these users need not open applications other than productivity management applications.

Collaboration content item editor 184 may receive from user's additional content for the collaboration content item. For example, collaboration content item editor 184 may be configured to receive from client devices 150 changes or edits to the collaboration content item. In various embodiments, the changes may include text, characters strings, or the like. The changes may also include annotations to the collaboration content item, comments to the collaboration content item, files to be attached to the collaboration content item, pictures to be attached to the collaboration content item, links to be attached to the collaboration content item, tasks related to the collaboration content item, or the like that can be incorporated into the collaboration content item. In various embodiments, edits to the collaboration content item are collaboration. For instance, collaboration content item editor 184 may obtain edits (e.g., text changes and/or additions of audio files, pictures, tables, or the like) from any number of client devices 150 at a given time (or in real time). Collaboration edits may be incorporated in a variety of formats, including formats that provide different text attributes such as colors, fonts, styles, or the like for different users.

In various embodiments, collaboration content item editor 184 (and or a security or permissions module associated with a server) may establish permissions and/or security for the collaboration content item. For example, collaboration content item editor 184 may enable event attendees to view and/or make edits to the collaboration content item while others may not have rights to view the collaboration content items and/or make changes. Permissions and/or security may be enforced in any number of ways. However, access to the collaboration content item may, in various embodiments, be provided to attendees of the event or a subset of attendees.

In some implementations, users can enter commands by providing pre-established primitives. A primitive can be a specified sequence of one or more characters that the content management system 106 recognizes as mapped to particular functionality. In some implementations, a primitive can be followed by one or more parameters specifying how the system should implement the corresponding functionality. Examples of primitives include a user identification primitive (e.g., "@" followed by a username parameter—referred to herein as a mention of a user), a task creation primitive (e.g., "[ ]" followed by a task title parameter), an emoji selector primitive (e.g., ":"), a content item selector and reference insertion primitive (e.g., "+" followed by at contentItem title parameter), a bullet list primitive (e.g., "*"), etc. Primitive parameters can define the corresponding functionality in various ways.

For example, the + primitive can operate by taking the content specified by a contentItemTitle parameter and attempting to match it to an existing content item. In some implementations, when such a match is found, the primitive, and any associated parameter, can be replaced in the collaboration content item with a reference to the content item, such as a URL. Such a reference, when activated, can load the referenced collaboration content item. In some implementations, a primitive can take another primitive as a parameter. For example, the content "[ ]@Jane" can be interpreted such that @Jane links to a user with the username "Jane," and this link is used by the primitive "[ ]" to creates a new task, where that task is assigned to the user Jane.

In various embodiments, collaborative content item editor 184 (and or a security or permissions module associated with a server) may establish permissions and/or security for the collaborative content item. For example, collaborative content item editor 184 may enable event attendees to view and/or make edits to the collaborative content item while others may not have rights to view the collaborative content items and/or make changes. Permissions and/or security may be enforced in any number of ways. However, access to the collaborative content item may, in various embodiments, be provided to attendees of the event or a subset of attendees.

In various embodiments, access to the collaboration content item is limited based on storage access rights. For example, a user with access rights to cloud storage may access, view, and/or make changes to the collaboration content item. In some embodiments, a user with access rights assigned by the content management system 106 may access, view, and/or make changes to the collaboration content item.

User notification service 186 may be configured to notify users of each of client devices 150 of information related to the state and/or contents of the collaboration content item. Notifications may be sent, for example as an email notification, a chat message notification, a notification in a display of the collaboration content item, or in relation to the collaboration content item through a file system or other organizational system. In various embodiments, user notification service 186 provides notifications about changes to client devices 150. For example, user notification service 186 may notify users whether a collaboration content item has been created for an event. As another example, user notification service 186 may notify specific users that they have been invited to attend an event.

Collaboration content item presentation service 188 may provide to client devices 150 selected collaboration content items. The collaboration content items may be displayed in client devices 150 through a native application, an Internet browsing window, or the like supported by client devices 150.

It will be appreciated that collaboration content item presentation service 188 may restrict writing permissions to the collaboration content items at any time. In an example, prior to occurrence of the event, collaboration content item presentation service 188 may restrict writing permissions to the collaboration content item (and turn the collaboration content item into a read-only collaboration content item) for all users except the creator or invoker of the collaboration content item. In some embodiments, the creator or invoker of the collaboration content item may select a subset of recipients to receive writing permissions.

Collaboration content item presentation service 188 may also support a collaboration content item viewing portal users can use to view existing collaboration content items. The collaboration content item viewing portal may order specific collaboration content items based on one or more ordering factors. "Ordering factors," as used herein, may include any factors used to order collaboration content items. Ordering factors can include factors used to order collaboration content items chronologically. More specifically, in some embodiments, the collaboration content item viewing portal orders collaboration content items according to the date(s) and/or times the collaboration content items were created. The collaboration content item viewing portal may also order collaboration content items according to the date(s) and/or time(s) the collaboration content items were edited. In various embodiments, the collaboration content item viewing portal orders collaboration content items according to the date(s) and/or time(s) of corresponding events to which the collaboration content items were related. Ordering factors can also include factors used to order collaboration content items according to the preferences of a specific user, such as whether the user has accepted events to which the collaboration content items were related.

In some embodiments, a collaboration content item viewing portal may be dedicated to a particular user who has received access to the collaboration content item because the particular user was related to an event. The user's collaboration content item viewing portal may provide access to any number of collaboration content items including the collaboration content item. The collaboration content items represented in the collaboration content item viewing portal may be ordered in any number of ways. For example, the collaboration content item viewing portal may order collaboration content items based on date and time of corresponding events.

The collaboration content item viewing portal may support search functions. For instance, the collaboration content item viewing portal may enable or allow searching for collaboration content items according to textual strings, titles, event attendees, and/or other attributes. The search functions may allow a specific user to search one or more collaboration content items for that user or for other users.

In some embodiments, productivity management modification service 190 may be configured to coordinate collaboration content items with calendar entries and to enable access to the collaboration content item through calendar entries.

Figure 2:
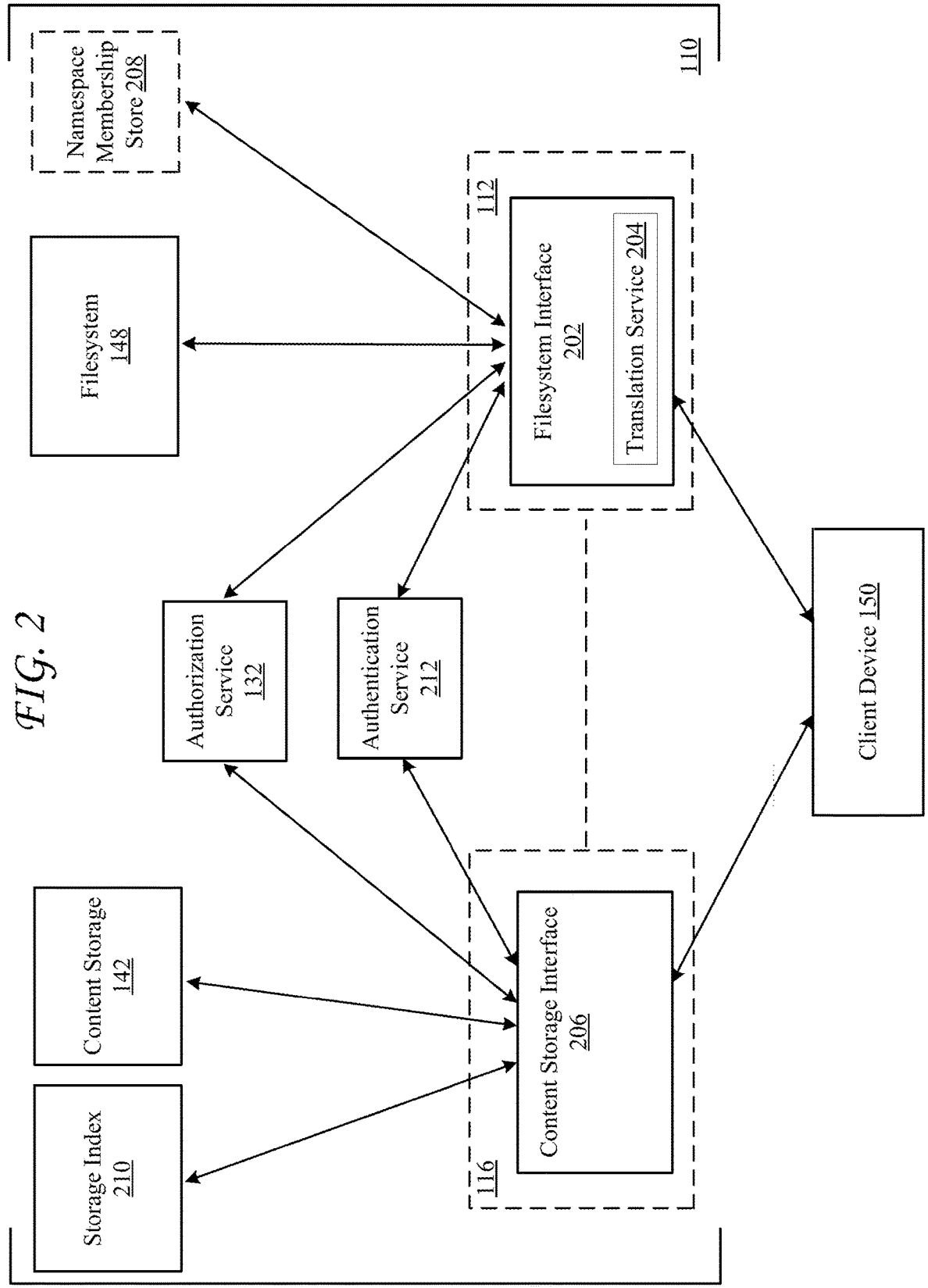
FIG. 2 is a schematic diagram showing an example architecture for synchronizing content between a content management system and client devices, in accordance with various embodiments of the subject technology.

FIG. 2 shows a schematic diagram of example architecture for synchronizing content between content management system 110 and client device 150 in configuration 100. In this example, client device 150 interacts with content storage 142 and filesystem 148 respectively via content storage interface 206 and filesystem interface 202. Content storage interface 206 can be provided or managed by content storage service 116, and filesystem interface 202 can be provided or managed by server synchronization service 112. For example, content storage interface 206 can be a subcomponent or subservice of content storage service 116, and filesystem interface 202 can be a subcomponent or subservice of server synchronization service 112.

Content storage interface 206 can manage communications, such as content requests or interactions, between client device 150 and content storage 142. Content storage interface 206 can process requests from client device 150 to upload and download content to and from content storage 142. Content storage interface 206 can receive content requests (e.g., downloads, uploads, etc.) from client device 150, authenticate client device 150 via authentication service 212, communicate with authorization service 132 to determine if client device 150 (and/or the request from client device 150) is authorized to upload or download the content to or from content storage 142 (e.g., based on permissions in access control list 145), and interact with content storage 142 to download or upload the content associated with the content requests from client device 150. If the request from client device 150 is a request to download a content item, content storage interface 206 can retrieve the content item from content storage 142 and provide the content item to client device 150. If the request from client device 150 is a request to upload a content item, content storage interface 206 can obtain the content item from client device 150 and upload the content item to content storage 142 for storage.

When processing content requests from client device 150, content storage interface 206 can communicate with storage index 210 to check the availability and/or storage location of the requested content in content storage 142, and track content items in content storage 142. Storage index 210 can maintain an index of content items on content storage 142 which identifies the content items on content storage 142 and can also identify a respective location of the content items within content storage 142. Thus, storage index 210 can track content items on content storage 142 as well as storage locations of the content items. Storage index 210 can track entire content items, such as files, and/or portions of the content items, such as blocks or chunks. In some cases, content items can be split into blocks or chunks which can be stored at content storage 142 and tracked in storage index 210. For example, content storage 142 can store a content item as blocks or chunks of data which include respective data portions of the content item. Storage index 210 can track the blocks or chunks of the content item stored in content storage 142.

Filesystem interface 202 can manage communications, such as metadata requests and content synchronizations and operations, between client device 150 and filesystem 148. For example, filesystem interface 202 can translate, validate, authenticate, and/or process operations, configurations, and state information between client device 150 and filesystem 148. Filesystem interface 202 can verify permissions from an FSAuth token in a cursor or through authorization service 132 to authorize, or verify authorization of, requests sent by client device 150 to filesystem 148. When processing requests or operations from client device 150, filesystem interface 202 can access namespace membership store 208 to determine or verify namespace ownership information for any namespaces associated with the requests or operations from client device 150, and verify permissions of content associated with the requests or operations from client device 150.

Translation service 204 in filesystem interface 202 can perform linearization and translation operations for communications between client device 150 and filesystem 148. For example, translation service 204 can translate communications from client device 150 to a different format consistent with the structure and format of data in filesystem 148, and vice versa. To illustrate, in some cases, client device 150 can process content item information (e.g., state, changes, versions, etc.) at client device 150 as operations, while filesystem 148 can process the same information as content item revisions reflected by rows in a data structure such as a database table. To enable synchronization of content item information between client device 150 and filesystem 148, translation service 204 can translate operations from client device 150 into revisions suitable for filesystem 148, and can translate revisions reflected in rows of data on filesystem 148 to operations suitable for client device 150.

In some cases, content management system 110 (e.g., filesystem interface 202, authorization service 132, or content storage interface 206) can generate a token that verifies or indicates that client device 150 is authorized to access, update, download, or upload a requested content item. The token can include a device identifier associated with client device 150, an account identifier associated with a user account authenticated or authorized at client device 150, a session identifier associated with an authorized session at client device 150, a view context, an encryption key, access permissions to identified content item(s), etc. The token can be provided with or in a cryptographically signed data object called a cursor, which will be described in greater detail below. Content management system 110 (e.g., filesystem interface 202, authorization service 132, or content storage interface 206) can send the token(s) to client device 150, and client device 150 can provide the token to content management system 110 when requesting content item revisions and/or updates to filesystem 148 as further described below. Client device 150 can also provide the token to content storage interface 206 to validate any content requests (e.g., downloads, uploads, etc.). Content storage interface 206 can use the token to authorize queries to storage index 210 and upload or download content items to or from content storage 142.

For example, client device 150 can send to content storage interface 206 a request to upload a content item to content storage 142. The request can include the token and the content item to be uploaded. Content storage interface 206 can use the token to authorize a query to storage index 210 to check if the content item already exists on content storage 142, and/or authorize the upload of the content item to content storage 142. Client device 150 can provide the token to filesystem interface 202 to authorize a request to store metadata on filesystem 148 to track the upload and revision of the content item.

Figure 3:
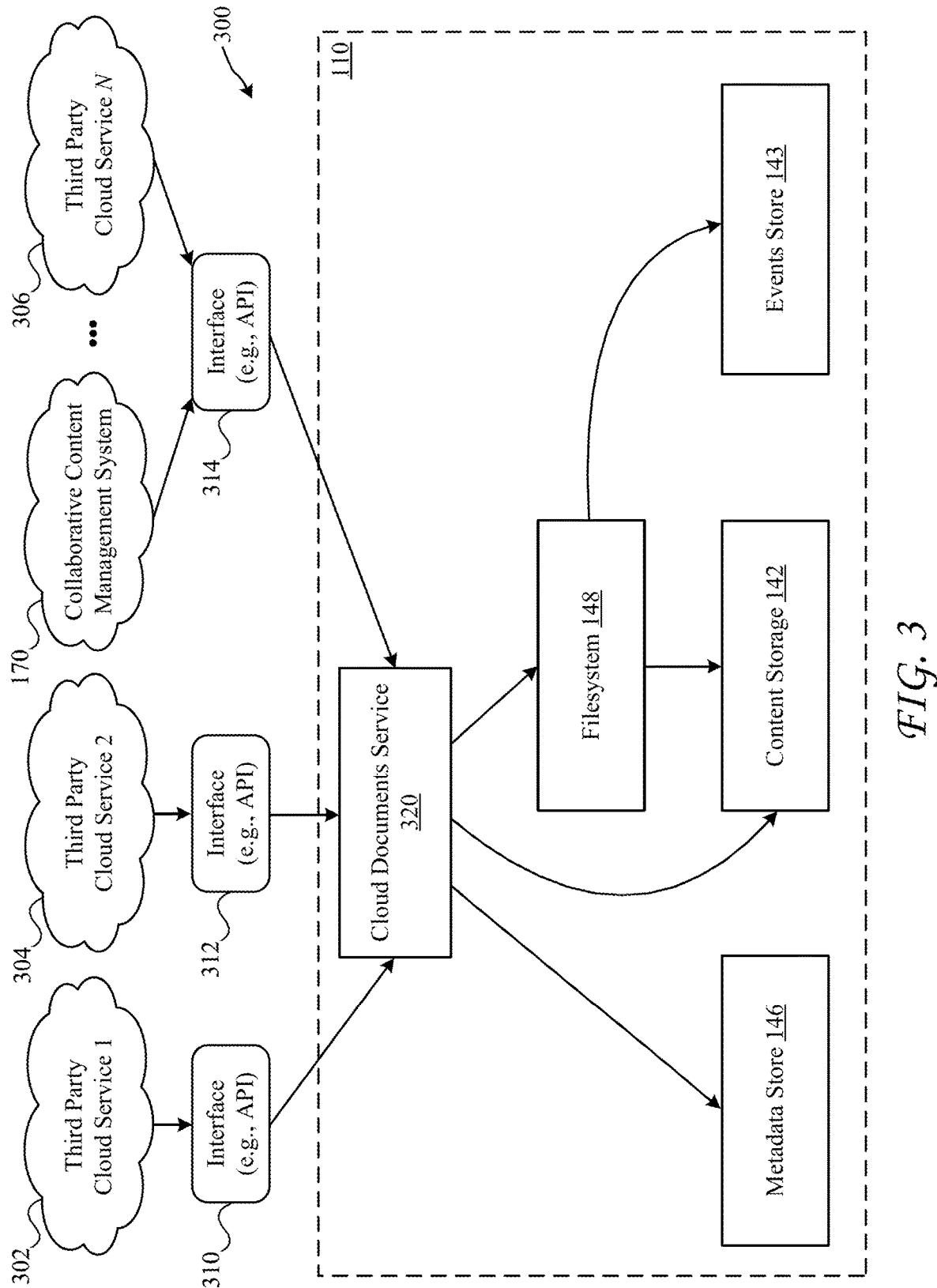
FIG. 3 is a diagram showing an example architecture for integrating cloud-based documents and functionalities from different cloud services into a content management system, in accordance with various embodiments of the subject technology.

FIG. 3 shows example architecture 300 for integrating cloud-based documents and functionalities from different cloud services into content management system 110. In this example, the different cloud services include third party cloud services 302, 304, 306 and collaborative content management system 170. Third party cloud services 302, 304, 306 and collaborative content management system 170 can store and manage various types of cloud-based documents, and can provide respective functionalities and features for the cloud-based documents, such as commenting, collaboration, sharing, editing, etc. The cloud-based documents can include documents or content items created, accessed, and/or manipulated via respective cloud-based applications or document editors. One or more of third party cloud services 302, 304, 306 may also provide various meeting services and features including, for example, calendaring or scheduling, audio/video conferencing, online meeting feature, or collaboration features.

Third party cloud services 302, 304, 306 and collaborative content management system 170 can host and/or provide one or more respective cloud-based applications or document editors for users to create, access, and/or interact with one or more respective types of cloud-based documents. In some cases, third party cloud services 302, 304, 306 and collaborative content management system 170 can provide one or more types of cloud-based applications or document editors respectively designed for one or more specific types of cloud-based documents. For example, a particular cloud-based application or document editor can be designed to handle a specific type of cloud-based document, including the creation, rendering, modification, and other types of interactions with the cloud-based document, as well as other features or functionalities for the cloud-based document such as collaboration, commenting, sharing, publishing, audio/video conferencing, scheduling meeting events, etc.

In some cases, the cloud-based applications or document editors can allow users to create online or web-based documents, publish the online or web-based documents, share the online or web-based documents, collaborate with other users through the online or web-based documents, store the online or web-based documents on a cloud storage associated with one or more respective cloud services, and/or interact in other ways with the online or web-based documents and/or users having access to the online or web-based documents. Moreover, in some cases, the cloud-based applications or document editors can be web-based applications provided by the cloud services (302, 304, 306, 170) for creating and interacting with respective types of cloud-based documents.

The cloud-based applications or document editors can support various respective types of documents, files, content, content formats, content features, content functionalities, etc. In some cases, a particular type of cloud-based document and/or associated functionalities may only be supported (fully or partially) by a cloud-based application or document editor associated with that particular type of cloud-based document. In other cases, a particular type of cloud-based document and/or associated functionalities may be supported (fully or partially) by other software applications. For example, a particular type of cloud-based document may be partially or fully supported by one or more separate software applications or tools.

To illustrate, a cloud-based document may be partially supported by a software application or tool that is capable of rendering the cloud-based document without the use of a cloud-based application or document editor used to create and interact with that particular cloud-based document. In some cases, the software application or tool may support a limited set of features or functionalities for that cloud-based document, but the cloud-based application or document editor associated with that cloud-based document would be otherwise necessary to access that cloud-based document's full range of features or functionalities.

Third party cloud services 302, 304, 306 and collaborative content management system 170 can communicate with cloud documents service 320 via interfaces 310, 312, 314. Interfaces 310, 312, 314 can be, for example, application programming interfaces (APIs) for exchanging data between cloud documents service 320 and third party cloud services 302, 304, 306 and collaborative content management system 170. Cloud documents service 320 can be a service that implements the logic and/or functionalities for interacting with cloud-based documents from the cloud services (302, 304, 306, 170). For example, cloud documents service 320 can provide the functionality for communicating with the cloud services (302, 304, 306, 170) to retrieve and update metadata for respective cloud-based documents from the cloud services (302, 304, 306, 170), communicating with the cloud services (302, 304, 306, 170) to retrieve and update content of the respective cloud-based documents from the cloud services (302, 304, 306, 170), exchanging activity information associated with the respective cloud-based documents with the cloud services (302, 304, 306, 170), authenticating with the cloud services (302, 304, 306, 170), etc.

Cloud documents service 320 can support various operations for communicating with the cloud services (302, 304, 306, 170), accessing features and functionalities associated with cloud-based documents and/or content management system 110, interacting with cloud-based documents stored in content storage 142 and/or the cloud services (302, 304, 306, 170), etc. Non-limiting examples of operations supported by cloud documents service 320 include operations to create content (e.g., cloud-based documents and/or content associated with cloud-based documents), operations to authenticate with cloud services (302, 304, 306, 170), operations to receive or update metadata associated with cloud-based documents, operations to retrieve cloud-based documents and/or related data from content storage 142 and/or the cloud services (302, 304, 306, 170), operations to restore cloud-based documents (and/or associated data) or request restoration of cloud-based documents (and/or associated data) from the cloud services (302, 304, 306, 170), commenting operations, operations to generate and/or present previews of cloud-based documents, operations to share cloud-based documents (and/or associated data), operations to revert to previous versions of cloud-based documents, operations to modify cloud-based documents (e.g., rename, move, delete, edit, etc.), and so forth.

Cloud documents service 320 can communicate with filesystem 148 to store or access metadata associated with cloud-based documents from the cloud services (302, 304, 306, 170). Filesystem 148 can store and provide such metadata for use by cloud documents service 320 and any other service in content management system 110. The metadata can include, for example and without limitation, information regarding changes to the cloud-based documents, access information associated with the cloud-based documents, data logs associated with the cloud-based documents, unique identifiers (IDs) associated with the cloud-based documents, description information associated with the cloud-based documents, version numbers or information associated with the cloud-based documents, timestamps associated with filesystem entries corresponding to the cloud-based documents, change history information for the cloud-based documents, pointers to content associated with the cloud-based documents, folders, file paths, etc.

Cloud documents service 320 can also communicate with metadata store 146 to update or retrieve metadata and objects in metadata store 146. Metadata store 146 can store other metadata and objects such as entities or associations pertaining to user accounts, cloud-based documents, user groups, namespaces, memberships, etc. For example, metadata store 146 may store, without limitation, metadata describing content items (e.g., cloud-based documents), content item types, comments, indexing data, access permissions, user or group memberships, sharing information, etc. In some examples, metadata store 146 can also store information describing the relationship of content items (e.g., cloud-based documents) to one or more accounts, collections, groups, namespaces, folders, team entities, etc., in metadata store 146.

Cloud documents service 320 can communicate with content storage 142 to store and/or retrieve content from content storage 142. Cloud documents service 320 can store and retrieve content from the cloud-based documents and/or representations of cloud-based documents, such as canonical content items as further described below. For example, in some cases, content storage 142 may store the content of one or more cloud-based documents for access to the content directly from content storage 142. In this example, cloud documents service 320 may retrieve, store, or update such content in content storage 142.

In other examples, content storage 142 may only store representations of one or more cloud-based documents, such as canonical content items as further described below. In this example, the representations of cloud-based documents may be retrieved from content storage 142 and provided to client devices requesting access to the cloud-based documents, but some or all of the actual content in the cloud-based documents may not be included in the representations and instead obtained from respective cloud services (302, 304, 306, 170) as further described below.

Cloud documents service 320 can also communicate with events store 143 to store, retrieve, and/or update activity and event information associated with cloud-based documents. Cloud documents service 320 can monitor events or activity from events store 143, obtain status information associated with cloud-based documents from events store 143, process events and/or metrics based on information in events store 143, generate or provide notifications or alerts based on information in events store 143, etc.

To organize a web conference meeting, a user typically creates a meeting event using a calendar interface associated with a calendar service. The meeting event may be associated with a meeting identifier and specify one or more times (e.g., for recurring meetings) and participants of the meeting event. The user may then set up a web conference (e.g., a video and/or audio conference) for the meeting event using a web conferencing interface associated with web conferencing service. Although some calendar services include web conferencing features, they do not allow for the use of third-party web conferencing services. As a result, a separate web conferencing interface is needed to use third-party services. To start a web conference meeting, a meeting participant opens the calendar interface, navigates to the option to join a meeting (which may involve several steps), and selects the option. In many cases, meeting participants may want to create and/or share content items with other participants. To do this, a user creates or locates a content item on a client device or a content management system using a content item interface and adds the content item to the meeting event using the calendar interface.

Aspects of the subject technology provide an improved user interface and user experience by allowing a user to perform web conference meeting and content management actions via a persistent user interface located conveniently on an operating system desktop of a client device. The persistent user interface may be, for example, a system tray for a version of the Microsoft Windows operating system or a menu bar for a version of the Macintosh operating system (e.g., macOS). The persistent user interface may include an interface element (e.g., an icon) that, when selected by a user, provides the user with options to join a web conference meeting, create a content item for the web conference meeting that is shared with meeting participants, and/or share existing content items with meeting participants. In some cases, the user interface may also identify content items that may be related with a current web conference meeting and allow for convenient sharing of the identified content items. The content items may be of different types and/or be associated with different cloud services.

Figure 4:
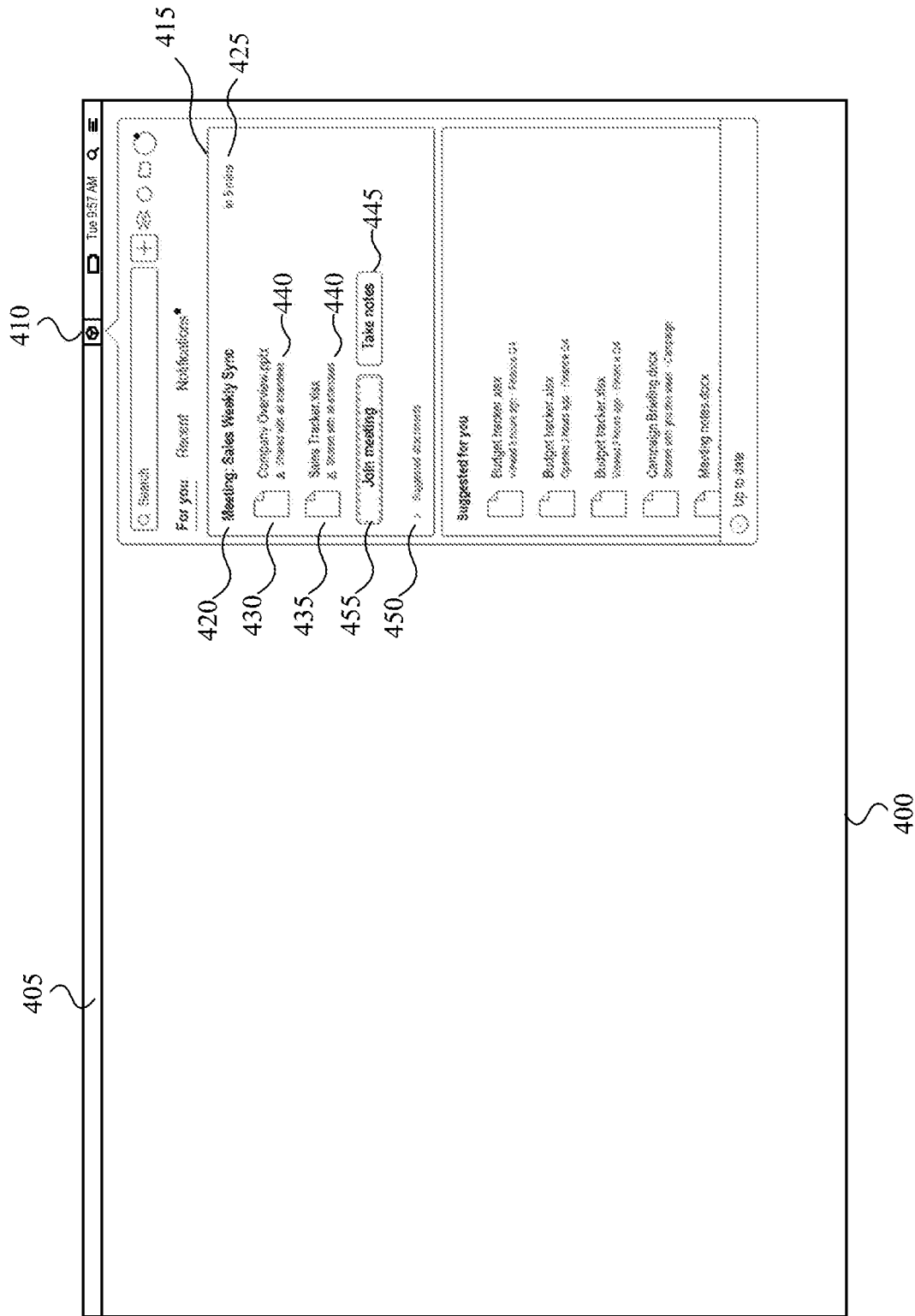
FIG. 4 is a diagram showing an example graphical user interface, in accordance with various embodiments of the subject technology.

FIG. 4 is a diagram showing an example graphical user interface 400, in accordance with various embodiments of the subject technology. The graphical user interface 400 may be an operating system desktop interface provided by the operating system (e.g., a version of Windows, Mac OS, etc.) of the client device. The graphical user interface 400 includes a persistent user interface 405 that is readily accessible on the operating system desktop. For example, the persistent user interface 405 may always appear on the operating system desktop, appear on top of any other interface on displayed on the operating system desktop, and/or be accessible by the user pressing a key and or navigating to a particular part of the screen. In some examples, the persistent user interface 405 may be a system tray for a version of the Microsoft Windows operating system or a menu bar for a version of the Macintosh operating system (e.g., macOS).

The persistent user interface 405 may include an interface element 410 (e.g., an icon button) that, when selected by a user, provides the user with one or more options associated with a meeting event. For example, the options may include creating a content item for the meeting event, attaching or associating an existing content item to the meeting event, starting or joining the meeting event, or other actions associated with the meeting event. The interface element 410 may be provided by a process running on a client device. The process may be, for example, associated with a client application (e.g., client application 152 in FIG. 1A) or service (e.g., client synchronization service 156 or client collaboration service 160). The process may be configured to interface with the file system on the client device, a content management system (e.g., content management system 110 of FIG. 1A), and/or one or more third party services (e.g., third party cloud service 302 of FIG. 1A) to provide meeting services or manage content items stored at one or more locations.

In FIG. 4, the options provided in response to a user selection of interface element 410 may be provided in a meeting card interface 415, where information for one or more identified meeting events may displayed and various actions associated with the identified meeting events be selected. The one or more meetings may be identified based on one or more user accounts, a current time, and meeting times for the one or more meeting events. For example, the user accounts may be for a user of the client device on which the interface element 410 is displayed. The user accounts may be associated with the content management system (e.g., content management system 110 of FIG. 1A), a meeting service (e.g., a calendaring service, an audio/video conferencing service, etc.), and/or other service. In some cases, the user may link a meeting service account to a content management system account, provide permissions, and/or opt-in to a meeting service providing meeting information to the content management system to enable certain functionalities for options provided in the meeting card interface 415.

A process running on a client device may be configured to query a meeting service and retrieve meeting information for meeting events associated with a meeting service user account. The meeting information may include a meeting title or subject, a list of attendees or participants, one or more locations, a start time, an end time, an agenda, meeting notes, attached or associated content items, or other meeting details. One or more meeting events may be selected based on selection criteria that may include meeting event times (e.g., the start time and/or the end time). For example, in various implementations, a next meeting event may be selected, all meetings within a time period (e.g., the next hour, the next 24 hours, the current day, etc.) may be selected, or a next number of meetings within a time period. In some embodiments, the meeting card interface 415 may include options to specify the selection criteria.

In FIG. 4, for example, a meeting event with a title of "Sales Weekly Sync" is selected. The meeting card interface 415 may display the title 420 of the selected meeting event, an indication 425 of when the meeting event is scheduled (e.g., a time left before a start time of the meeting event, the start time of the meeting event, "now," etc.), or other information associated with the selected meeting event. The meeting card interface 415 may also display content items 430 and 435 that are attached or otherwise associated with the meeting event. User selection of the one of the content items 430 and 435 may cause the selected content item to be opened on the client device. By enabling the display of a selected content item, the meeting card interface 415 provides a quick and convenient way to access content items associated with a meeting event. Accessing the meeting card interface 415 is also done via the interface element 410, which is in a known and consistent location and requires fewer steps to reach.

The meeting card interface 415 may further display the sharing status 440 of each of the content items 430 and 435 displayed in the meeting card interface 415. Although the sharing status 440 is displayed for content items that are already attached or otherwise associated with the meeting event in FIG. 4, in other embodiments, the sharing status may be displayed for suggested content items as well. The sharing status 440 for a content item may indicate whether the content item is accessible to all attendees or participants listed for the meeting event, some attendees or participants for the meeting event, none of the attendees or participants, or specify specific numbers, attendees, participants, or users that can access the content item.

The meeting card interface 415 may further enable a user to create content items for a meeting event. Often meetings are centered on or aided by content items such as agendas, notes, presentations, collaboration documents, images, etc. Accordingly, the meeting card interface 415 includes an option 445 to create a content item such as meeting notes. The meeting notes may be a specific type of document, a text document, or input that can be inputted into the meeting event information (e.g., meeting notes). In some embodiments, the content creation interface may allow for a user to select or specify a particular type of content item to create. In some embodiments the meeting notes may be a content item associated with a specific meeting content item template. The content item can be associated with a content management system. In some embodiments, the meeting event information (e.g., title, agenda, notes, attendees, etc.) may be used to prepopulate the meeting notes. In some embodiments, the meeting notes may be automatically shared with all attendees and/or participants of the meeting event. In other embodiments, a user may be presented with options to share the meeting notes with one or more attendees and/or participants of the meeting event.

The meeting card interface 415 may also display suggested content items accessible to the user account that may be attached or associated with the meeting event. For example, meeting card interface 415 includes an option 450 to display suggested content items. The suggested content items may be selected based on any meeting event information (e.g., title, agenda, notes, attendees, etc.), user account information, user activity information, or other information accessible to the content management system. A user may select the content item to attach or associate the selected content item to the meeting event. In some embodiments, the meeting card interface 415 may also provide a search interface to search for content items to attach or associate with a meeting event. In some embodiments, the selected content item may be automatically shared with all attendees and/or participants of the meeting event. In other embodiments, a user may be presented with options to share the selected content item with one or more attendees and/or participants of the meeting event. According to some aspects of the subject technology, the process running on the client device may be configured to automatically open a preexisting content item or content item after the content item is attached or associated to the meeting event.

The meeting card interface 415 may also include options to perform various actions associated with the meeting event. For example, an option may be to join the meeting event 455, present or share a screen, launch a meeting application, or other action. The actions associated with the meeting event may be performed through or in cooperation with a content management system, a meeting service, and/or other third-party service through an interface such as an application programming interface (API).

By providing the meeting card interface 415 on the persistent user interface 405 on the operating system desktop, a user is able to access content items and actions associated with a meeting event more directly, with fewer steps, with less time (e.g., time locating the correct interface elements, time waiting for an application to load, etc.), and/or with less distance traversed across the desktop interface.

Figure 5A:
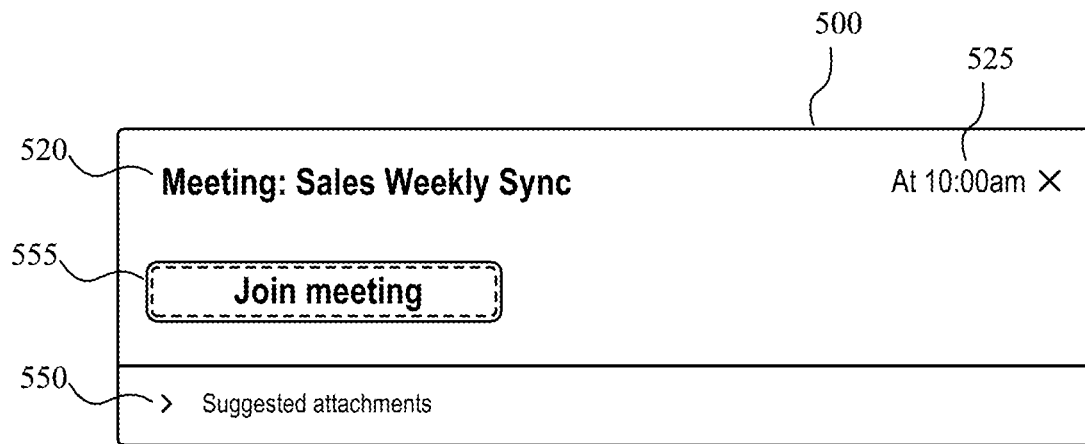
FIGS. 5A-5C are diagrams that show example meeting card interfaces, in accordance with various embodiments of the subject technology.
Figure 5B:
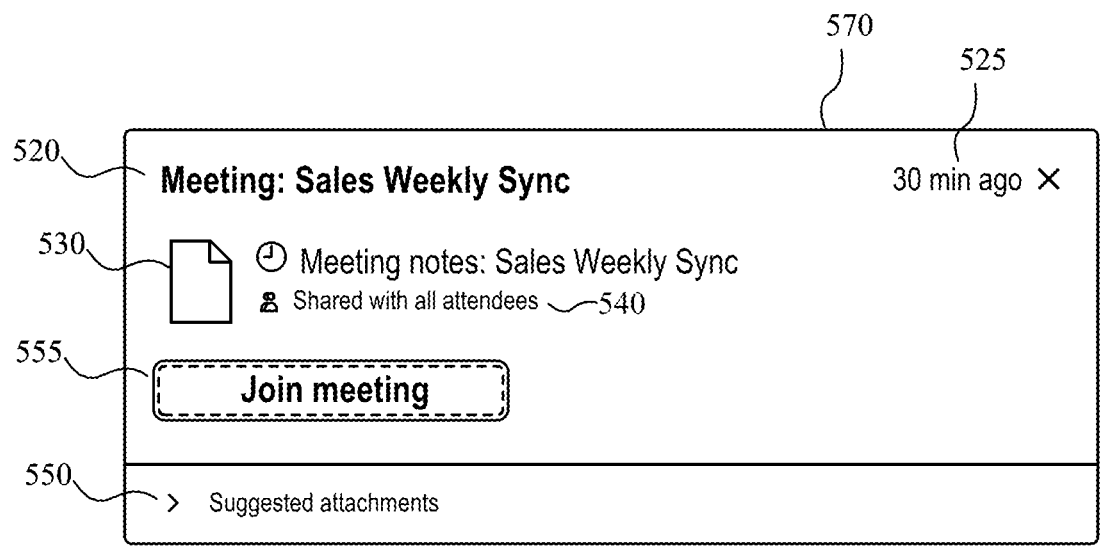
Figure 5C:
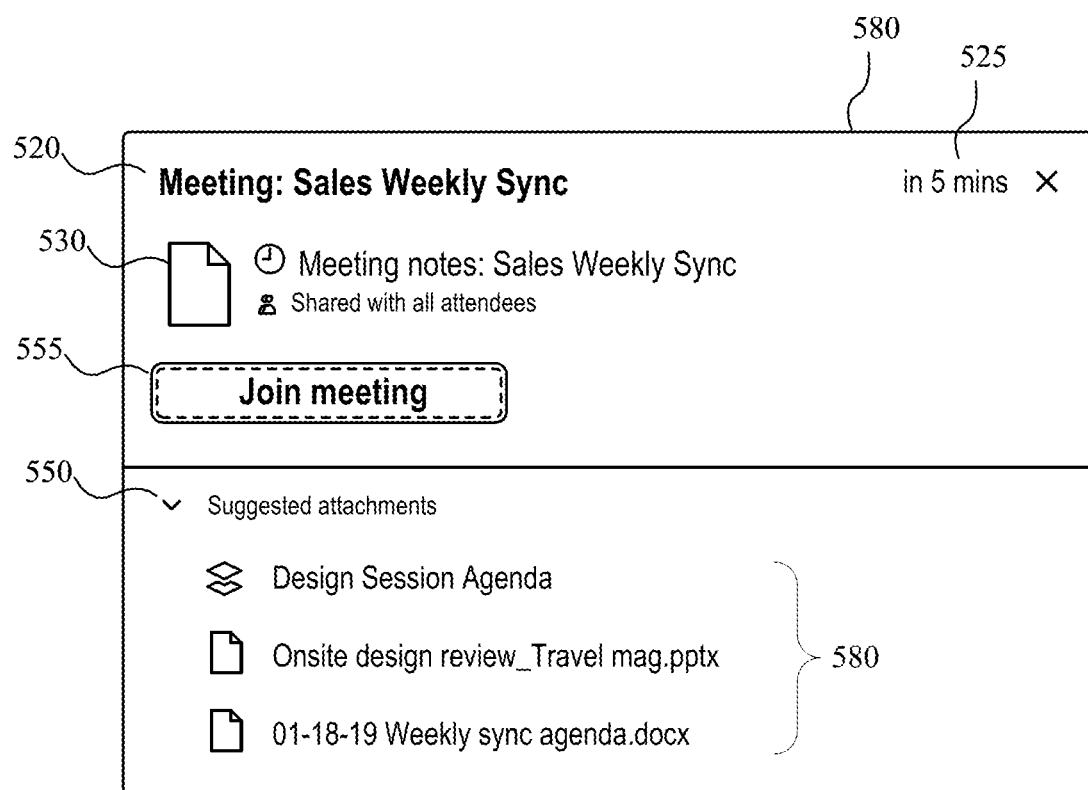

FIGS. 5A-5C are diagrams that show example meeting card interfaces, in accordance with various embodiments of the subject technology. A user may select an interface element (e.g., an icon button) on a persistent user interface on a desktop interface provided by the operating system of a client device to display one or more options associated with a meeting event. The options may be provided in, for example, the meeting card interfaces illustrated in FIGS. 5A-5C.

The diagram of FIG. 5A illustrates an example meeting card interface 500 for a meeting event where there are no content items (e.g., attachments) currently attached or associated with the meeting event. The meeting card interface 500 includes a meeting title 520, an indication of when the meeting event is scheduled 525, and a join option 555 for joining the meeting. In FIG. 5A, the indication of when the meeting event is scheduled 525 is a scheduled start time for the meeting event. However, in other embodiments, the indication of when the meeting event is scheduled may be a time left before the scheduled start time for the meeting, a time left before the scheduled end time for the meeting, a time since the meeting start time or end time passed, or some other indication or relative indication of the timing of the meeting event. The meeting card interface 500 also includes an interface element 550 that provides the user with an option to display suggested content items to attach to the meeting event.

The diagram of FIG. 5B illustrates an example meeting card interface 570 for a meeting event with an attached or associated content item. The meeting card interface 570 includes a meeting title 520, an indication of when the meeting event is or was scheduled 525, and a join option 555 for joining the meeting. The meeting card interface 570 also interface element showing the content item 530 that is already attached or associated with the meeting event. The interface element showing the content item 530 shows the title or name of the content item and other information associated with the content item. For example, the sharing status 540 for the content item is shown in FIG. 5B. The sharing status 540 may include all users of the content management system that may have access to the content item or be based on the subset of users that are also listed participants or attendees of the meeting event.

The meeting card interface 570 also includes an interface element 550 that provides the user with an option to display suggested content items to attach to the meeting event. For example, in a response to a user selection of the interface element 550 of FIG. 5B, the meeting card interface 580 of FIG. 5C may be displayed. The meeting card interface 580 of FIG. 5C displays suggested content items 580 to attach to the meeting event. The suggested content items may be selected based on any meeting event information (e.g., title, agenda, notes, attendees, etc.), user account information, user activity information, or other information accessible to the content management system. A user may select the content item to attach or associate the selected content item to the meeting event. Selection of one or more of the suggested content items 580 may cause the selected content items to be attached or otherwise associated with the meeting event.

For illustrative purposes, FIGS. 5A-5C show example meeting card interfaces that include options for a single meeting event. However, in other embodiments, options for multiple meeting events may be shown. For example, in some cases, multiple meetings may be scheduled during a day, back-to-back, in quick succession, or on overlapping time periods. It may be convenient to display information and options for multiple meeting events in a meeting card interface. Furthermore, the number of meeting events and/or the conditions in which multiple meeting events are shown in a meeting card interface may be configurable by the system or a user.

Figure 6A:
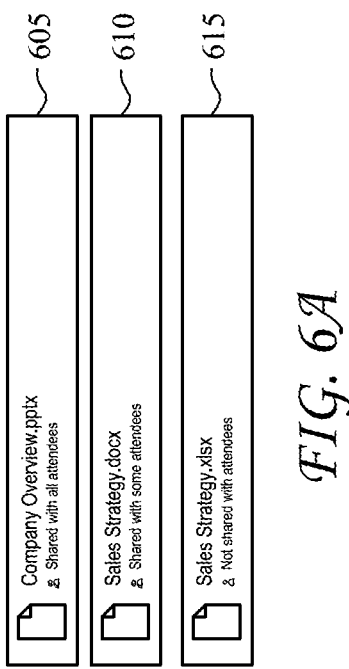
FIGS. 6A-6C are diagrams that illustrate sharing permissions and sharing statuses, in accordance with various embodiments of the subject technology.
Figure 6B:
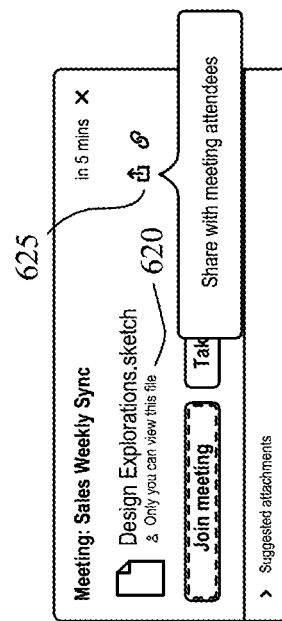
Figure 6C:
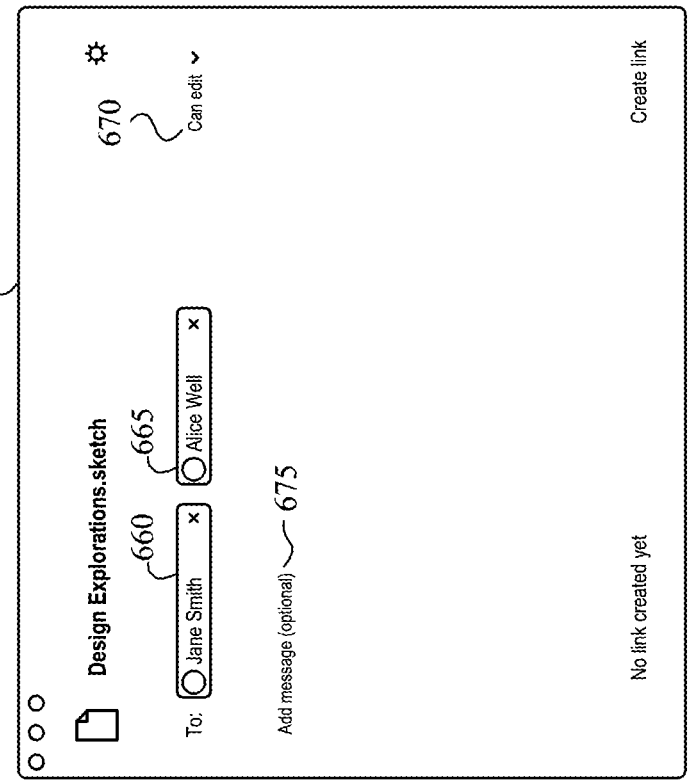

FIGS. 6A-6C are diagrams that illustrate sharing permissions and sharing statuses, in accordance with various embodiments of the subject technology. As noted above, meeting card interfaces may display the sharing status of various content items that are suggested and/or associated with one or more meeting events. The sharing status for a content item may indicate whether the content item is accessible to all attendees or participants listed for the meeting event, some attendees or participants for the meeting event, or none of the attendees or participants. The sharing status may alternatively or additionally specify specific numbers and/or list attendees, participants, or users that can access the content item. The sharing status may include all users of the content management system that may have access to the content item or be based on the subset of users that are also listed participants or attendees of the meeting event.

FIG. 6A illustrates 3 example sharing statuses 605, 610, and 615 for 3 different content items associated with meeting events. Sharing status 605 indicates that the content item "Company Overview.pptx" is shared with all listed attendees of a particular meeting event. Sharing status 610 indicates that the content item "Sales Strategy.docx" is shared with some listed attendees of a particular meeting event. Sharing status 615 indicates that the content item "Sales Strategy.xlsx" is not shared with the listed attendees of a particular meeting event.

FIG. 6B illustrates a meeting card interface that includes options associated with a content item. The meeting card interface includes a sharing status 620 indicating that only the user account of the user of the client device can access the content item. This may be a result of a user initially attaching or associating the content item to the meeting event. The content item may not have previously been shared with other users. In other embodiments, however, content items may be automatically shared with other attendees of a meeting event or a prompt may appear that enables the user to share the content item with other attendees. The meeting card interface may also include an option 625 to share the content item with listed meeting attendees or participants. In response to a user selection of the option 625 to share the content item, a sharing interface 650 of FIG. 6C may be displayed.

The sharing interface 650 of FIG. 6C may enable a user to share the content item with one or more users. The sharing interface 650 may be prepopulated with listed attendees 660 and 665 of the meeting event in order to save the user time from having to input users to share the content item with. The sharing interface 650 may allow the user to add additional users to share with whom to share the content item and/or remove listed users. The sharing interface 650 may also allow the user to specify what type of permissions (e.g., read only, edit, delete, etc.) the listed attendees 660 and 665 can receive. The sharing interface 650 may also include a field where the user can input a message that can be used as notes associated with the content item or a message to the listed attendees 660 and 665 providing them with context.

Figure 7:
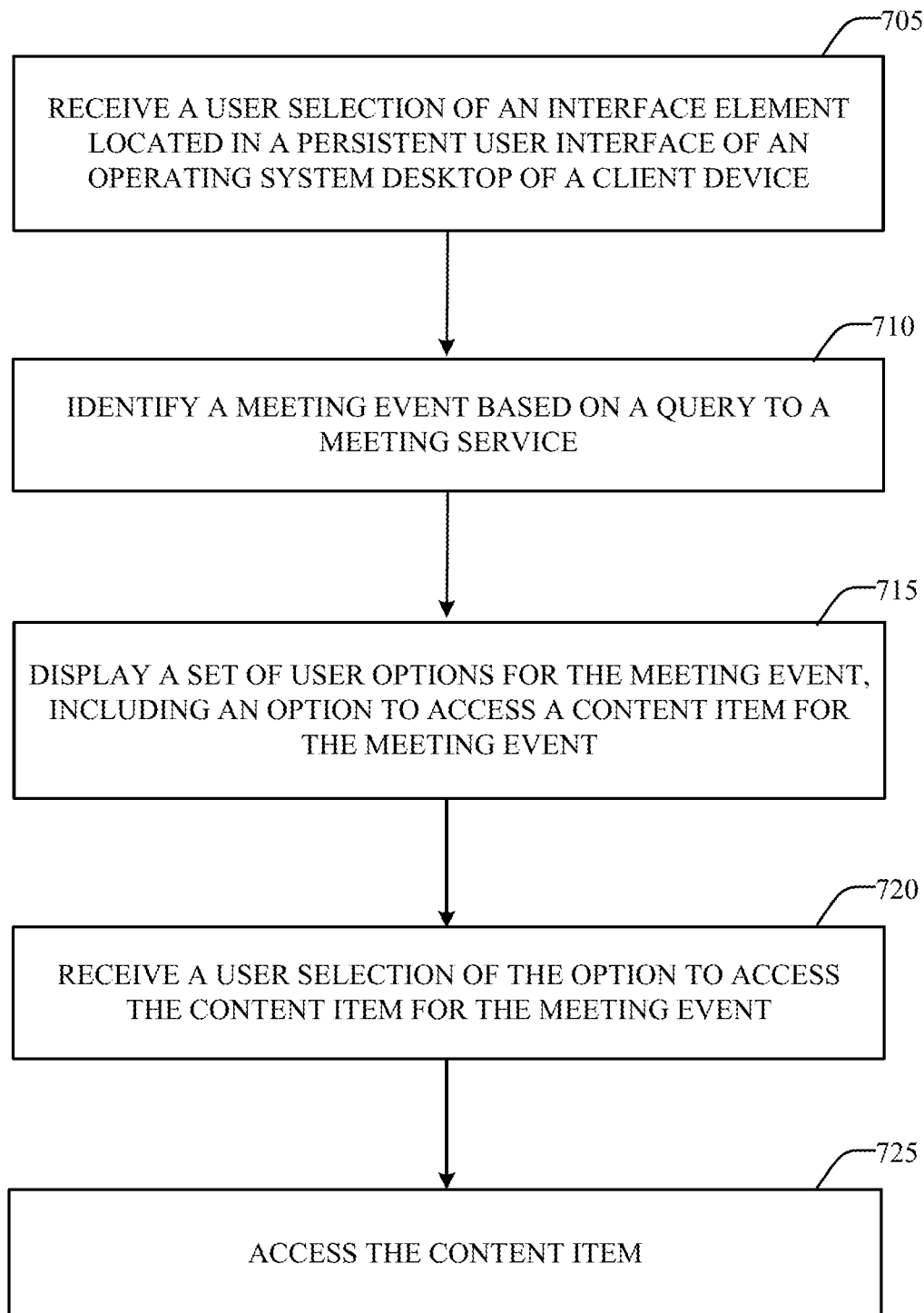
FIG. 7 shows an example method for accessing a content item associated with a meeting event, in accordance with various aspects of the subject technology.

FIG. 7 shows an example method for accessing a content item associated with a meeting event, in accordance with various aspects of the subject technology. The steps outlined herein are non-limiting examples provided for illustration purposes, and can be implemented in any combination thereof, including combinations that exclude, add, or modify certain steps. In some aspects, the method may be performed by client device and/or, more specifically, a process running on a client device. The process may be, for example, associated with a client application (e.g., client application 152 in FIG. 1A) or service (e.g., client synchronization service 156 or client collaboration service 160). The process may be configured to interface with the file system on the client device, a content management system (e.g., content management system 110 of FIG. 1A), a meeting service, and/or one or more third party services to manage content items stored on the file system of the client device, the content management system, and/or the third party services.

At operation 705, the client device receives a user selection of an interface element located in a persistent user interface of an operating system desktop of a client device. The persistent user interface may be a system tray for a version of the Microsoft Windows operating system or a menu bar for a version of the macOS. The interface element (e.g., an icon button), when selected by a user, provides the user with one or more options or actions associated with one or more meeting events.

For example, at operation 710, the client device identifies a meeting event based on one or more queries to a meeting service. The queries to the meeting service are configured to obtain information associated with the meeting event such as meeting identifiers, titles, names, times, agendas, notes, attachments, listed attendees, location, etc. The queries to the meeting service may be for meeting information for a user account for the meeting service that is associated with the client device. In some embodiments, all meeting information for meeting events within a certain time period may be retrieved using a first set of one or more queries. However, in other embodiments, a certain subset of information (e.g., meeting ID, meeting times, or other meeting selection criteria) may be retrieved in a first stage while other information is retrieved at a second stage. For example, additional meeting information for a specific meeting may be queried after a meeting event is selected based on selection criteria.

One or more meeting events may be identified based on selection criteria that may include meeting event times (e.g., the start time and/or the end time) and a current time. For example, in various implementations, a next meeting event (e.g., a meeting event with a start time closest to the current time) may be selected, all meetings within a time period (e.g., the next hour, the next 24 hours, the current day, etc.) may be selected, or a next number of meetings within a time period. In some embodiments, the meeting card interface 415 may include options to specify the selection criteria.

At operation 715, the client device displays a set of user options for the identified meeting event. The set of user options may be displayed in, for example, a meeting card interface and may include one or more options to access one or more content items for the identified meeting events. The options may include, for example, options to create a content item to attach to the identified meeting event, find and select an existing content item to attach to the meeting event, view content items that are attached to a meeting event, join a meeting event, or share a content item with other attendees of a meeting event.

The one or more user options may also include option to attach one or more of the suggested content items to the meeting event. The client device may be configured to generate a set of suggested content items based on meeting information for meeting events obtained from the meeting service. For example, a name or title of a meeting event may be retrieved from the meeting service based on one or more queries to the meeting service. The client device may search for one or more suggested content items based on the name or title of the meeting event. In some embodiments, the search may involve a search of the file system of the client device, a search request sent to a content management system to identify suggested content items stored by the content management system, or a combination. Once the suggested content items are identified, the client device may display one or more options to attach and/or associate the suggested content items to the meeting event.

At operation 720, the client device may receive a user selection of an option to access the content item for the meeting event and, at operation 725, accessing the content item in response to the user selection. More specifically, depending on which option is selected and the type of access desired, different actions with content items may be taken. The types of access may include opening a content item, creating a content item, sharing a content item with meeting participants, attaching a content item to the meeting event, searching for a content item to attach to the meeting event, or a combination of these or other actions.

For example, in FIG. 5B, user selection of the "Meeting notes: Sales Weekly Sync" content item 530 that is already attached or associated with the meeting event may trigger the option to open the "Meeting notes: Sales Weekly Sync" content item 530. In FIG. 5C, user selection of one of the suggested content items 580 may cause the selected content item to be attached or otherwise associated with the meeting event. In FIG. 4, user selection of the option 445 to create a content item such as meeting notes may trigger the creating of a content item for attaching to the meeting event. In some embodiments, the user may be able to specify a content item type (e.g., meeting notes, presentation, spreadsheet, content management system document, etc.) for the content item to be created. In FIG. 6B, user selection of the option 625 to share the content item may initiate the process of sharing the content item with other users (e.g., listed participants of the meeting event).

According to some embodiments, the options displayed on the client device may also include actions associated with the meeting event. For example, in FIG. 5A, user selection of the option to join the meeting event 555 may cause the client device to join the meeting event. In cases where all or portions of the meeting event experience are provided by a meeting service, joining the meeting event may include the client device communicating and coordinating with the meeting service to launch the meeting the event. Additional options associated with the meeting event may include, for example, sharing a screen of the client device, recording the meeting event, ending the meeting event, muting the audio of a user, interfacing with and/or enabling video conferencing services, or other such actions.

Figure 8:
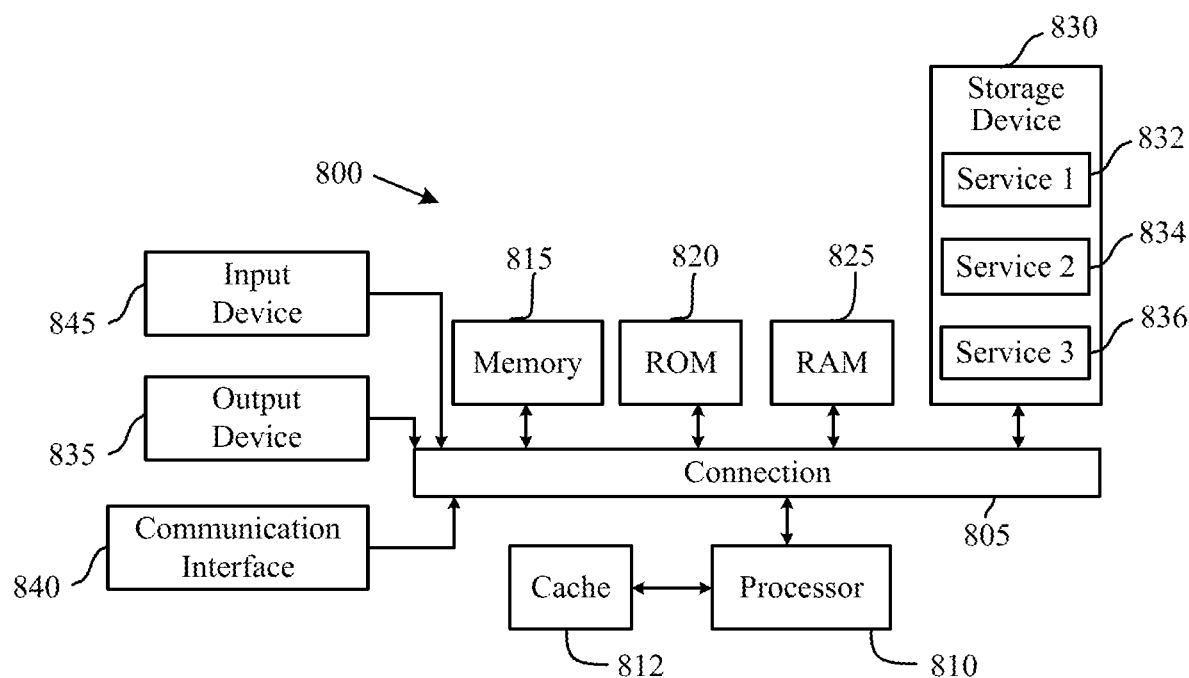
FIG. 8 shows an example system for implementing various aspects of the present technology.

FIG. 8 shows an example of computing system 800, which can be for example any computing device making up client device 150, content management system 110 or any component thereof in which the components of the system are in communication with each other using connection 805. Connection 805 can be a physical connection via a bus, or a direct connection into processor 810, such as in a chipset architecture. Connection 805 can also be a virtual connection, networked connection, or logical connection.

In some embodiments, computing system 800 is a distributed system in which the functions described in this disclosure can be distributed within a datacenter, multiple datacenters, a peer network, etc. In some embodiments, one or more of the described system components represents many such components each performing some or all of the function for which the component is described. In some embodiments, the components can be physical or virtual devices.

Example computing system 800 includes at least one processing unit (CPU or processor) 810 and connection 805 that couples various system components including system memory 815, such as read only memory (ROM) 820 and random access memory (RAM) 825 to processor 810. Computing system 800 can include a cache of high-speed memory 812 connected directly with, in close proximity to, or integrated as part of processor 810.

Processor 810 can include any general purpose processor and a hardware service or software service, such as services 832, 834, and 836 stored in storage device 830, configured to control processor 810 as well as a special-purpose processor where software instructions are incorporated into the actual processor design. Processor 810 may essentially be a completely self-contained computing system, containing multiple cores or processors, a bus, memory controller, cache, etc. A multi-core processor may be symmetric or asymmetric.

To enable user interaction, computing system 800 includes an input device 845, which can represent any number of input mechanisms, such as a microphone for speech, a touch-sensitive screen for gesture or graphical input, keyboard, mouse, motion input, speech, etc. Computing system 800 can also include output device 835, which can be one or more of a number of output mechanisms known to those of skill in the art. In some instances, multimodal systems can enable a user to provide multiple types of input/output to communicate with computing system 800. Computing system 800 can include communications interface 840, which can generally govern and manage the user input and system output. There is no restriction on operating on any particular hardware arrangement and therefore the basic features here may easily be substituted for improved hardware or firmware arrangements as they are developed.

Storage device 830 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read only memory (ROM), and/or some combination of these devices.

The storage device 830 can include software services, servers, services, etc., that when the code that defines such software is executed by the processor 810, it causes the system to perform a function. In some embodiments, a hardware service that performs a particular function can include the software component stored in a computer-readable medium in connection with the necessary hardware components, such as processor 810, connection 805, output device 835, etc., to carry out the function.

For clarity of explanation, in some instances the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program, or a collection of programs that carry out a specific function. In some embodiments, a service can be considered a server. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, solid state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language reciting "at least one of" refers to at least one of a set and indicates that one member of the set or multiple members of the set satisfy the claim. For example, claim language reciting "at least one of A and B" means A, B, or A and B.

What is claimed is:

1. A method comprising:
   receiving a user selection of an interface element located in a persistent user interface to launch an application linked to a user account of a content management system;
   identifying, based on a query to a third-party meeting service, a meeting event associated with the user account;
   in response to the user selection of the interface element, causing display of the application including a user interface pertaining to the meeting event, the user interface comprising an identification of at least one suggested content item from the content management system for the meeting event, wherein the content item is configured to be shared with at least one other participant of the meeting event;
   receiving a user selection of the at least one suggested content item; and
   displaying, on the persistent user interface, the at least one suggested content item, wherein the suggested content item is configurable to be edited by the at least one other participant.

2. The method of claim 1, wherein the identification of the at least one suggested content item is based on information accessible to the content management system.

3. The method of claim 2, wherein the information accessible to the content management system includes meeting event information.

4. The method of claim 3, wherein the meeting event information includes at least one of a meeting title, a meeting agenda, meeting notes, or meeting attendees.

5. The method of claim 2, wherein the information includes at least one of a user account information and user activity information.

6. The method of claim 2, wherein the information includes a user selected content item or a user selection of one of the at least one suggested content item.

7. The method of claim 2, wherein the information is based on permissions associated with the at least one suggested content item.

8. The method of claim 1, further comprising:
   receiving, from the third-party meeting service, meeting event information; and
   identifying the at least one suggested content item based on the meeting event information received from the third-party meeting service.

9. The method of claim 1, further comprising:
   providing, in response to the user selection, a user interface for sharing the at least one suggested content item on the content management system with each meeting participant.

10. A computing device comprising:
    one or more processors; and
    at least one non-transitory computer-readable medium having stored therein instructions which, when executed by the one or more processors, cause the computing device to:
    receive a user selection of an interface element located in a persistent user interface to launch an application linked to a user account of a content management system;
    identify, based on a query to a third-party meeting service, a meeting event associated with the user account;
    in response to the user selection of the interface element, cause display of the application including a user interface pertaining to the meeting event, the user interface comprising an identification of at least one suggested content item from the content management system for the meeting event, wherein the content item is configured to be shared with at least one other participant of the meeting event;
    receive a user selection of the at least one suggested content item; and
    display, on the persistent user interface, the at least one suggested content item, wherein the suggested content item is configurable to be edited by the at least one other participant.

11. The computing device of claim 10, wherein the identification of the at least one suggested content item is based on information accessible to the content management system.

12. The computing device of claim 11, wherein the information accessible to the content management system includes meeting event information.

13. The computing device of claim 12, wherein the meeting event information includes at least one of a meeting title, a meeting agenda, meeting notes, or meeting attendees.

14. The computing device of claim 11, wherein the information includes at least one of a user account information and user activity information.

15. The computing device of claim 11, wherein the information includes a user selected content item or a user selection of one of the at least one suggested content item.

16. The computing device of claim 11, wherein the information is based on permissions associated with the at least one suggested content item.

17. The computing device of claim 10, wherein the instructions further cause the computing device to:

receive, from the third-party meeting service, meeting event information; and identify the at least one suggested content item based on the meeting event information received from the third-party meeting service.

18. The computing device of claim 10, wherein the instructions further cause the computing device to:

provide, in response to the user selection, a user interface for sharing the at least one suggested content item on the content management system with each meeting participant.

19. A non-transitory computer-readable medium comprising instructions that, when executed by one or more processors, cause a computing device to:

receive a user selection of an interface element located in a persistent user interface to launch an application linked to a user account of a content management system;

identify, based on a query to a third-party meeting service, a meeting event associated with the user account;

in response to the user selection of the interface element, cause display of the application including a user interface pertaining to the meeting event, the user interface comprising an identification of at least one suggested content item from the content management system for the meeting event, wherein the content item is configured to be shared with at least one other participant of the meeting event;

receive a user selection of the at least one suggested content item; and display, on the persistent user interface, the at least one suggested content item, wherein the suggested content item is configurable to be edited by the at least one other participant.

20. The non-transitory computer-readable medium of claim 19, wherein the identification of the at least one suggested content item is based on meeting event information accessible to the content management system.

* * * * *